US006636950B1

(12) United States Patent
Mithal et al.

(10) Patent No.: US 6,636,950 B1
(45) Date of Patent: Oct. 21, 2003

(54) COMPUTER ARCHITECTURE FOR SHARED MEMORY ACCESS

(75) Inventors: Arvind Mithal, Arlington, MA (US); Xiaowei Shen, Cambridge, MA (US); Lawrence Rogel, Brookline, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/300,641

(22) Filed: Apr. 27, 1999

Related U.S. Application Data

(60) Provisional application No. 60/124,127, filed on Mar. 12, 1999, and provisional application No. 60/112,619, filed on Dec. 17, 1998.

(51) Int. Cl.$^7$ .............................................. G06F 12/00
(52) U.S. Cl. .................... 711/147; 711/117; 711/141; 711/143
(58) Field of Search ............................. 711/117, 141, 711/143, 147

(56) References Cited

U.S. PATENT DOCUMENTS

| | | | |
|---|---|---|---|
| 5,749,095 A | 5/1998 | Hagersten | 711/141 |
| 5,778,423 A | 7/1998 | Sites et al. | 711/118 |
| 5,829,025 A | 10/1998 | Mittal | 711/122 |
| 5,860,126 A | 1/1999 | Mittal | 711/167 |
| 5,873,117 A | 2/1999 | Hagersten et al. | 711/148 |
| 5,887,138 A | 3/1999 | Hagersten et al. | 395/200.45 |
| 5,893,144 A | 4/1999 | Wood et al. | 711/122 |
| 5,909,697 A * | 6/1999 | Hayes et al. | 711/144 |
| 6,021,468 A * | 2/2000 | Arimilli et al. | 711/122 |
| 6,038,642 A | 3/2000 | Arimilli et al. | 711/130 |

OTHER PUBLICATIONS

Aditya et al., "Semantics pf pH: A parallel dialect of Haskell", Computation Structures Group Memo, 377–1, Jun. 7, 1995.

Adve et al., "Weak Ordering—A New Definition", IEEE, 1990.

Adve et al., "A Unified Formalization of Four Shared–Memory Models", Computer Sciences Technical Report #1051, 1992.

Adve et al., "Shared Memory Consistency Models: A Tutorial", IEEE, Sep. 1995.

Adve et al., "A Retrospective on 'Weak Ordering—A New Definition'", First 25 International Symposia on Computer Architecture, ACM Press, 1998.

Ang et al., "The Start–Voyager Parallel System", International Conference on Parallel Architectures and Compilation Techniques (PACT '98), Oct. 13–17, 1998, Paris, France.

(List continued on next page.)

Primary Examiner—Donald Sparks
Assistant Examiner—Mehdi Namazi
(74) Attorney, Agent, or Firm—Fish & Richardson P.C.

(57) ABSTRACT

A computer architecture that includes a hierarchical memory system and one or more processors. The processors execute memory access instructions whose semantics are defined in terms of the hierarchical structure of the memory system. That is, rather than attempting to maintain the illusion that the memory system is shared by all processors such that changes made by one processor are immediately visible to other processors, the memory access instructions explicitly address access to a processor-specific memory, and data transfer between the processor-specific memory and the shared memory system. Various alternative embodiments of the memory system are compatible with these instructions. These alternative embodiments do not change the semantic meaning of a computer program which uses the memory access instructions, but allow different approaches to how and when data is actually passed from one processor to another.

29 Claims, 11 Drawing Sheets

OTHER PUBLICATIONS

Bennett et al., "Adaptive Software Cache Management for Distributed Shared Memory Architectures", Proceedings of the 17$^{th}$ Annual International Symposium on Computer Architecture, May 1990.

Blumofe et al., "An Analysis of Dag–Consistent Distributed Shared–Memory Algorithms", Proceedings of the Eighth Annual ACM Symposium on Parallel Algorithms and Architectures (SPAA), Jun. 24, 26, 1996, Padua, Italy.

Chandra et al., "Teapot: Language Support for Writing Memory Coherence Protocols", SIGPLAN Conference on Programming Language Design and Implementation (PLDI), May 1996.

Cox et al., "Adaptive Cache Coherency for Detecting Migratory Shared Data", ISCA93, May 1993.

Eggers et al., "Evaluating the Performance of Four Snooping Cache Coherency Protocols", Proceedings of the 16$^{th}$ Annual International Symposium on Computer Architecture, May 1989.

Falsafi et al., "Application–Specific Protocols for User–Level Shared Memory", Supercomputing, Nov. 1994.

Frigo et al., "Computation–Centric Memory Models", Proceedings of the 10$^{th}$ ACM Symposium on Parallel Algorithms and Architectures (SPAA), Jun. 28–Jul. 2, 1998.

Gao et al., "Advanced Compilers, Architectures and Parallel Systems", ACAPS Technical Memo 78, Dec. 31, 1993.

Gao et al., "Location Consistency—a New Memory Model and Cache Consistency Protocol", CAPSL Technical Memo 16, Feb. 16, 1998.

Gharachorloo et al., "Memory Consistency and Event Ordering in Scalable Shared–Memory Multiprocessors", The Proceedings of the 17$^{th}$ International Symposium on Computer Architecture, pp. 15–26, May 1990.

Gharachorloo et al., "Two Techniques to Enhance the Performance of Memory Consistency Models", Computer Systems Laboratory, 1991.

Gharachorloo et al., "Programming for Different Memory Consistency Models", Journal of Parallel and Distributed Computing, 1992.

Hill, Mark D., "Multiprocessors Should Support Simple Memory Consistency Models", IEEE Computer, 1998.

Keleher et al., "Lazy Release Consistency for Software Distributed Shared Memory", Department of Computer Science, Mar. 9, 1992.

Lamport, Leslie, "How to Make a Multiprocessor Computer that Correctly Executes Multiprocess Programs,", IEEE Transactions on Computers, vol. 28, No. 9, Sep. 1979.

Lenoski et al., "The DASH Prototype: Implementation and Performance", ACM, 1992.

Mukherjee et al., "Using Protection to Accelerate Coherence Protocols", International Symposium on Computer Architecture, 1998.

Ranganathan et al., "An Evaluation of Memory Consistency Models for Shared–Memory Systems with ILP Processors", Proceedings of ASPLOS–VII, Oct. 1996.

Scheurich et al., "Correct Memory Operation of Cache–Based Multiprocessors", ACM, 1987.

Shen et al., "A Methodology for Designing Correct Cache Coherence Protocols for DSM Systems", Computation Structures Group Memo 398 (A) 1997.

Shen et al., "Modeling and Verification of ISA Implementations", Computation Structures Group Memo 400 (A), Jun. 1997.

Stenstrom et al., "An Adaptive Cache Coherence Protocol Optimized for Migratory Sharing", Proceedings of the 20$^{th}$ Annual International Symposium on Computer Architecture, May 1993.

Weber et al., "Analysis of Cache Invalidation Patterns in Multiprocessors", Proceedings of the 3$^{rd}$ International Conference on Architectural Support for Programming Languages and Operating Systems, 1989.

* cited by examiner

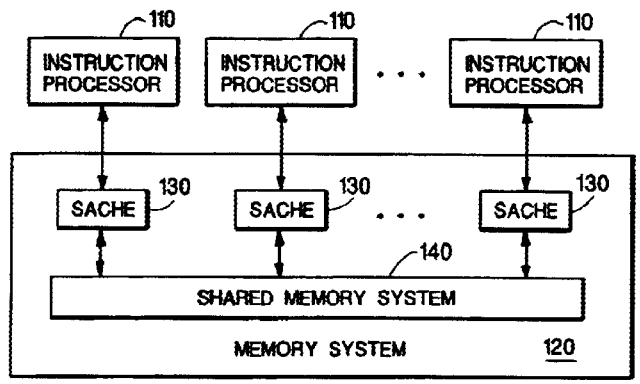
FIG. 1A
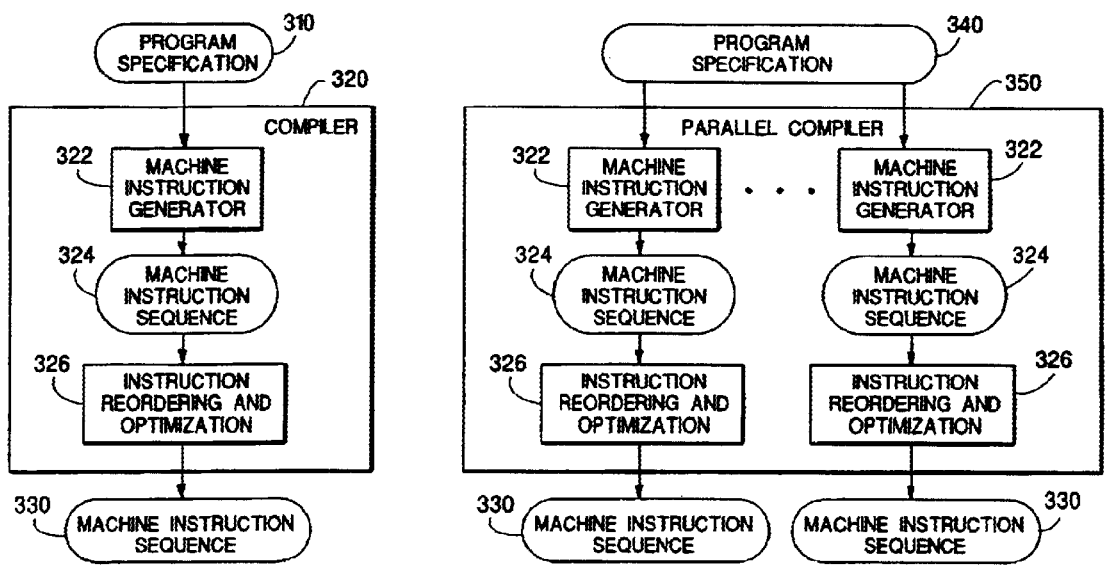
FIG. 3A
FIG. 3B

**Process Load(*addr*): 410**

| | |
|---|---|
| 411 | IF Cell(*addr*,-,*Invalid*) THEN |
| 412 |     CREATE Cell(*addr*,-,*Cache-Pending*) |
| 413 |     SEND Cache-Request(addr) message |
| 414 |     WAIT FOR Cache(*addr,val*) return message |
| 415 |     SET Cell(*addr,val,Clean*) |
| 416 |     RETURN *val* |
| 417 | ELSE IF Cell(*addr,val,*-) |
| 418 |     RETURN *val* |
| 419 | ENDIF |

FIG. 4A

**Process Reconcile(*addr*) message: 430**

| | |
|---|---|
| 431 | IF Cell(*addr*,-,*Clean*) THEN |
| 432 |     DELETE *addr* from sache storage (Cell(*addr*,-,*Invalid*)) |
| 433 | END IF |
| 434 | RETURN ack |

FIG. 4B

**Process StoreL(*addr,val*) message:     460**

461    IF Cell(*addr,-,Invalid*) THEN
462         CREATE Cell(*addr,-,-*)
463    END IF
464    SET Cell(addr,val,Dirty)
465    RETURN ack

FIG. 4C

**Process Commit(*addr*) message:     470**

471    IF Cell(*addr,val,Dirty*) THEN
472         SET Cell(*addr,val,Writeback-Pending*)
473         SEND Writeback(*addr,val*) message
474         WAIT FOR ack message
475         SET Cell(*addr,val,Clean*)
476    END IF
477    RETURN acknowlegment

FIG. 4D

Create Cell(*addr*,-,*status*):  480

481   IF no space available in sache storage THEN
482       SELECT Cell(*addr'*,val',*status'*) such that *status'* = Clean or Dirty
483       IF *status'* = Dirty THEN
484           SEND Writeback(*addr'*,*val'*) message
485           WAIT FOR ack message
486       END IF
487       DELETE Cell(addr',val',status')
488   END IF
489   SET Cell(addr,-,status) in available cell

FIG. 4E

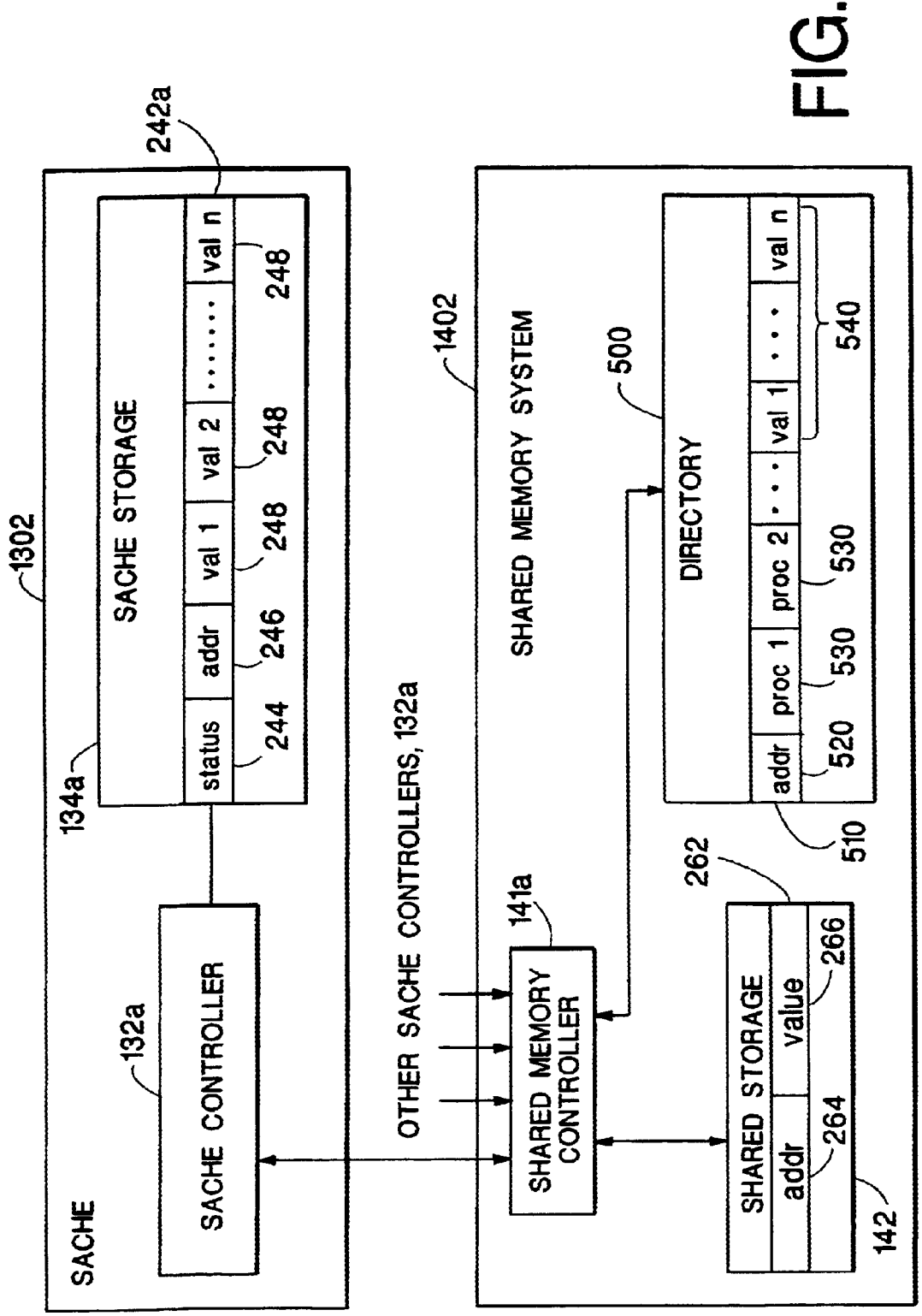

|     | Process LoadL(*addr*): | 610 |
| --- | --- | --- |
| 611 | IF Cell(*addr*,-,*Invalid*) THEN | |
| 612 |     CREATE Cell(*addr*,-,*Cache-Pending*) | |
| 613 |     SEND Cache-Request(addr) message | |
| 614 |     STALL LoadL processing UNTIL Cache message is processed | |
| 615 |     GET *val* from Cell(*addr,val,Clean*) | |
| 616 |     RETURN *val* | |
| 617 | ELSE IF Cell(*addr,val,Clean*) OR Cell(*addr,val,Dirty*) THEN | |
| 618 |     RETURN *val* | |
| 619 | ENDIF | |

FIG. 6A

|     | Process Reconcile(*addr*) message: | 630 |
| --- | --- | --- |
| 631 | RETURN ack | |

FIG. 6B

**Process StoreL(*addr,val*) message:          640**

641     IF Cell(*addr,-,Invalid*) THEN
642          CREATE Cell(*addr,-,Cache-Pending*)
643          SEND Cache-Request(*addr*) message
644          STALL StoreL(addr) processing UNTIL Cache(addr) message
645     END IF
646     SET Cell(*addr,val,Dirty*)
647     RETURN ack

FIG. 6C

**Process Commit(*addr*) message:          650**

651     IF Cell(*addr,val,Dirty*) THEN
652          SET Cell(*addr,val,Writeback-Pending*)
653          SEND Writeback(*addr,val*) message
654          STALL Commit(*addr*) processing UNTIL Writeback ack
655          SET Cell(*addr,val,Clean*)
656     END IF
657     RETURN ack

FIG. 6D

| | Process Cache(*addr,val*): | 670 |
|---|---|---|
| 671 | IF Cell(*addr,-,Invalid*) THEN | |
| 672 |     CREATE Cell(*addr,-,-*) | |
| 673 |     SET Cell(*addr,val,Clean*) | |
| 674 | ELSE IF Cell(*addr,-,Cache-Pending*) | |
| 675 |     SET Cell(*addr,val,Clean*) | |
| 676 |     RESTART STALLED LoadL(*addr*) and StoreL(*addr*) | |
| 677 | ENDIF | |

FIG. 6E

| | Process Writeback-Ack(*addr*) message: | 680 |
|---|---|---|
| 681 | IF Cell(*addr,val,Writeback-Pending*) THEN | |
| 682 |     SET Cell(*addr,val,Clean*) | |
| 683 |     RESTART STALLED Commit(*addr*) processing | |
| 684 | END IF | |

FIG. 6F

Process Purge-Request(*addr*) message: <u>690</u>

691  IF Cell(*addr,-,Clean*) THEN
692      DELETE *addr* from sache storage
693      SEND Purged(*addr*) message
694  ELSE IF Cell(*addr,-,Dirty*) THEN
695      SEND Writeback(*addr*) message
696      DELETE *addr* from sache storage
697  ENDIF

FIG. 6G

COMPUTER ARCHITECTURE FOR SHARED MEMORY ACCESS

CROSS-REFERENCE TO RELATED APPLICATIONS

This application claims the benefit of U.S. Provisional Application No. 60/112,619 filed on Dec. 17, 1998, and the benefit of U.S. Provisional Application No. 60/124,127 filed on Mar. 12, 1999.

BACKGROUND

This invention relates to a computer architecture that includes a shared memory system.

Many current computer systems make use of hierarchical memory systems to improve memory access from one or more processors. In a common type of multiprocessor system, the processors are coupled to a hierarchical memory system made up of a shared memory system and a number of memory caches, each coupled between one of the processors and the shared memory system. The processors execute instructions, including memory access instructions such as "load" and "store," such that from the point of view of each processor, a single shared address space is directly accessible to each processor, and changes made to the value stored at a particular address by one processor are "visible" to the other processor. Various techniques, generally referred to as cache coherency protocols, are used to maintain this type of shared behavior. For instance, if one processor updates a value for a particular address in its cache, caches associated with other processors that also have copies of that address are actively notified by the shared memory system and the notified caches remove or invalidate that address in their storage, thereby preventing the other processors from using out-of-date values. The shared memory system keeps a directory that identifies which caches have copies of each address and uses this directory to notify the appropriate caches of an update. In another approach, the caches share a common communication channel (e.g., a memory bus) over which they communicate with the shared memory system. When one cache updates the shared memory system, the other caches "snoop" on the common channel to determine whether they should invalidate any of their cached values.

In order to guarantee a desired ordering of updates to the shared memory system and thereby permit synchronization of programs executing on different processors, many processors use instructions, generally known as "fence" instructions, to delay execution of certain memory access instructions until other previous memory access instructions have completed. The PowerPC "Sync" instruction and the Sun SPARC "Membar" instruction are examples of fence instructions in current processors. These fences are very "course grain" in that they require all previous memory access instructions (or a class of all loads or all stores) to complete before a subsequent memory instruction is issued.

Many processor instruction sets also include a "prefetch" instruction that is used to reduce the latency of Load instructions that would have required a memory transfer between the shared memory system and a cache. The prefetch instruction initiates a transfer of data from the shared memory system to the processor's cache but the transfer does not have to complete before the instruction itself completes. A subsequent Load instruction then accesses the prefetched data, unless the data has been invalidated in the interim by another processor or the data have not yet been provided to the cache.

SUMMARY

As the number of processors grows in a multiple processor system, the resources required by current coherency protocols grow as well. For example, the bandwidth of a shared communication channel used for snooping must accommodate updates from all the processors. In approaches in which a shared memory system actively notifies caches of memory updates, the directory or other data structure used to determine which caches must be notified also must grow, as must the communication resources needed to carry the notifications. Furthermore, in part to maintain high performance, coherency protocols have become very complex. This complexity has made validation of the protocols difficult and design of compilers which generate code for execution in conjunction with these memory systems complicated.

In a general aspect, the invention is a computer architecture that includes a hierarchical memory system and one or more processors. The processors execute memory access instructions whose semantics are defined in terms of the hierarchical structure of the memory system. That is, rather than attempting to maintain the illusion that the memory system is shared by all processors such that changes made by one processor are immediately visible to other processors, the memory access instructions explicitly address access to a processor-specific memory, and data transfer between the processor-specific memory and the shared memory system. Various alternative embodiments of the memory system are compatible with these instructions. These alternative embodiments do not change the semantic meaning of a computer program which uses the memory access instructions, but allow different approaches to how and when data is actually passed from one processor to another. Certain embodiments of the shared memory system do not require a directory for notifying processor-specific memories of updates to the shared memory system.

In one aspect, in general, the invention is a computer system that includes a hierarchical memory system and a first memory access unit, for example, a functional unit of a computer processor that is used to execute memory access instructions. The memory access unit is coupled to the hierarchical memory system, for example over a bus or some other communication path over which memory access messages and responses are passed. The hierarchical memory system includes a first local storage, for example a data cache, and a main storage. The first memory access unit is capable of processing a number of different memory access instructions, including, for instance, instructions that transfer data to and from the memory system and instructions, instructions that guarantee that data transferred to the memory system is accessible to other processors, and instructions that access data previously written by other processor. The first memory access unit is, in particular, capable of processing the following instructions:

A first instruction, for example, a "store local" instruction, that specifies a first address and a first value. Processing this first instruction by the first memory access unit causes the first value to be stored at a location in the first local storage that is associated with the first address. For example, if the local storage is a cache memory, the processing of the first instruction causes the first value to be stored in the cache memory, but not necessarily to be stored in the main memory and accessible to other processors prior to the processing of the first instruction completing.

A second instruction, for example, a "commit" instruction, that specifies the first address. Processing of the second instruction by the first memory access unit after processing the first instruction is such that the first memory access unit completes processing of the second instruction after the first value is stored at a location in the main storage that is associated with the first address. For example, the processing of the second instruction may cause the value to be transferred to the main storage, or alternatively the transfer of the value may have already been initiated prior to the processing of the second instruction, in which case the second instruction completes only after that transfer is complete.

Using these instructions, the memory access unit can transfer data to the local storage without necessarily waiting for the data, or some other form of notification, being propagated to other portions of the memory system. The memory access unit can also determine when the data has indeed been transferred to the main storage and made available to other processors coupled to the memory system, for example when that data is needed for coordinated operation with other processors.

The first memory access unit can also be capable of processing the following instructions:

A third instruction, for example, a "load local" instruction, that specifies the first address. Processing of the third instruction by the first memory access unit causes a value to be retrieved by the memory access unit from a location in the first local storage that is associated with the first address.

A fourth instruction, for example, a "reconcile" instruction, that also specifies the first address. Processing of the fourth instruction by the first memory access unit prior to processing the third instruction causes the value retrieved during processing the third instruction to be a value that was retrieved from a location in the main storage that is associated with the first address at some time after the fourth instruction was begun to be processed. For example, the fourth instruction may cause the third instruction to execute as a cache miss and therefore require retrieving the specified data from the main memory.

Using these latter two instructions, the memory access unit can retrieve data from the local storage without having to wait for the data to be retrieved from main memory. If data from main memory is needed, for example to coordinate operation of multiple processors, then the fourth instruction can be used.

These computer systems can have multiple memory access units coupled to the hierarchical memory system, for example in a multiple processor computer system in which each processor has a memory access unit, and the hierarchical memory system has a separate local storage, such as a cache storage, associated with each processor. In such a system, processing the fourth instruction by a second memory access unit prior to processing the third instruction and after the first memory access unit has completed processing the second instruction causes the value retrieved during processing the third instruction to be a value that was retrieved from a location in the main storage that is associated with the first address at a time after the fourth instruction was begun to be processed. In this way, the value caused to be retrieved by the processing of the third instruction by the second memory access unit is the first value, which was specified in the first instruction which was processed by the first memory access unit.

These four instructions provide the advantage that memory access to the local storages can be executed quickly without waiting for communication between the local storages and the main storage, or between the local storages themselves. Note that the values stored in different local storages in locations associated with the same address are not necessarily kept equal, that is, the local storages are not coherent. Nevertheless, the instructions also allow coordination and synchronization of the operation of multiple processors when required.

In another aspect, in general, the invention is a computer processor for use in a multiple processor system in which the computer processor is coupled to one or more other processors through a memory system, the computer processor includes a memory access unit configured to access the memory system by processing a number of memory access instructions. The memory access instructions can include (a) a first instruction that specifies a first address and a first value, wherein processing the first instruction causes the first value to be stored at a location in the memory system that is associated with the first address, such that for at least some period of time the one or more other processors do not have access to the first value, and (b) a second instruction that specifies the first address, wherein processing of the second instruction after processing the first instruction is such that the processing of the second instruction completes after the first value is accessible to each of the one or more other processors. The instructions can additionally include (c) a third instruction that specifies a second address, wherein processing of the third instruction causes a value to be retrieved from a location in the memory system that is associated with the second address, and (d) a fourth instruction that specifies the second address, wherein processing of the fourth instruction prior to processing the third instruction causes the third instruction to retrieve a value that was previously stored in the memory system by one of the one or more other processors.

In another aspect, in general, the invention is a multiple processor computer configured to use a storage system. The computer includes multiple of memory access units including a first and a second memory access unit each coupled to the storage system. The first memory access unit is responsive to execution of instructions by a first instruction processor and the second memory access unit responsive to execution of instructions by a second instruction processor. The first and the second memory access units are each capable of issuing memory access messages to the storage system, for example messages passing data to the storage system or messages requesting data from the storage system, and receiving return messages from the storage system in response to the memory access messages, for example return messages providing data from the storage system or return messages that acknowledge that data has been transferred and stored in the storage system. In particular, the memory access messages and return messages can include:

A first memory access message that specifies a first address and a first value. Receipt of this message by the storage system causes the first value to be stored at a first location in storage system that is associated with the first address.

A first return message that is a response to the first memory access message, indicating that the first value has been stored in the storage system at a location that is associated with the first address and that is accessible to the memory access unit receiving the first return message.

A second return message indicating that the first value has been stored in the storage system at a location that is associated with the first address and that is accessible to each of the plurality of memory access units.

The messages can also include a second memory access message that specifies the first address, and wherein the second return message is a response to the second memory access message.

In another aspect, in general, the invention is a memory system for use in a multiple processor computer system in which the memory system is coupled to multiple computer processors. The memory system includes a number of local storages, including a first local storage unit and other local storage units, and each local storage unit is capable of processing various messages received from a corresponding one of the computer processors. These messages include (a) a first message that specifies a first address and a first value, wherein processing the first message by the first local storage unit causes the first value to be stored at a location in the local storage unit that is associated with the first address, such that, for at least a period of time, the other local storage units do not have access to the first value, and (b) a second message that specifies the first address, wherein processing of the second message by the first local storage unit after processing the first message is such that the processing of the second message completes after the first value can be accessed by each of the other local storage units.

The messages can also include (c) a third message that specifies a second address, wherein processing of the third message causes a value to be retrieved from a location in the first local storage that is associated with the second address and to be sent to the corresponding computer processor, and (d) a fourth message that specifies the second address, wherein processing of the fourth message prior to processing the third message guarantees that the value caused to be sent in processing the third message is a value that was previously stored in the memory system by one of the other processors.

The memory system can also include a main storage such that values stored in the main storage are accessible to each of the of local storages and a controller configured to transfer data between the main storage and the plurality of local storages according to a plurality of stored rules. These rules can include a rule for initiating a transfer of the first value from the local storages to the main storage after processing the first message and prior to processing the second message. An advantage of this system is that the rules can guarantee that the data transfers initiated by the controller do not affect the desired operating characteristics of the computers coupled to the memory system.

In another aspect, in general, the invention is a computer processor for use in a multiple processor computer system in which the computer processor and one or more other computer processors are coupled to a storage system. The computer processor includes a storage capable of holding a sequence of instructions. In particular, the sequence of instructions can include a first instruction, for example, a "fence" or a "synchronization" instruction, that specifies a first address range, for example a specific address or a starting and an ending address, and a second address range, and includes a first set of instructions that each specifies an address in the first address range and that are prior to the first instruction in the sequence, and a second set of instructions that each specifies an address in the second address range and that are after the first instruction in the sequence. The computer processor also includes an instruction scheduler coupled to the storage. The instruction scheduler is configured to issue instructions from the sequence of instructions such that instructions in the second set of instructions do not issue prior to all of the instructions in the first set of instructions completing.

This aspect of the invention can include one or more of the following features.

The first set of instructions includes instructions that may result in data previously stored in the storage system by one of the one or more other processors at an address in the first address range being transferred to the computer processor. For example, in a system with local storages accessible to corresponding processors, and a main storage that is accessible to all processors, the set of instructions can include all instructions that transfer data from an address in the first range from the local storage to the processor, since if that data were previously transferred from the main storage to the local storage, the transfer from local storage to the processor would result in data previously stored in the storage system by another processor being transferred.

The first set of instructions includes instructions that each complete after the instruction scheduler receives a corresponding notification from the storage system that a value has been stored in the storage system at an address in the first address range such that the value is accessible to the one or more other processors.

The second set of instructions includes instructions that each initiates a transfer of data from the computer processor to the storage system for storage at an address in the second address range such that the data is accessible to the one or more other processors.

The second set of instructions includes instructions that may result in data previously stored in the storage system by one of the one or more other processors at an address in the second address range being transferred to the computer processor.

An advantage of this aspect of this invention is that operation of multiple processors can be coordinated, for example using flags in the shared memory, while limiting the impact of the first instruction by not affecting the scheduling of instructions that do not reference the second address range, and by not depending on the execution of instructions that do not reference the first address range.

Embodiments of the invention have one or more of the following advantages.

Specification of computer programs in terms of memory access instructions which have precise semantics and which explicitly deal with a hierarchical memory structure allows compilers to optimize programs independently of the design of the target memory architecture.

Since a compiler does not have to have knowledge of the particular implementation of the memory system that will be used, memory system designers can implement more complex coherency approaches without requiring modifications to the compilers used.

Fewer communication resources are required to implement coherency between the processors-specific memories that are required with many current coherency approaches.

The shared memory system does not necessarily have to maintain a directory identifying which processors have copies of a memory location thereby reducing the storage requirements at that shared memory system, and reducing the complexity of maintaining such a directory. In embodiments that do use a directory, the directory can have a bounded size limiting the number of processors that are identified as having a copy of a location while allowing a larger number to actually have copies.

Validation of the correctness of a particular implementation of a cache coherency approach is simplified since the semantics of memory instructions does not depend on the specific implementation of the cache coherency approach.

Other features and advantages of the invention are apparent from the following description, and from the claims.

DESCRIPTION OF DRAWINGS

FIG. 1A illustrates a multiple processor computer system which includes a memory system that has memory associated with each processor and a shared memory system accessible to all the processors;

FIG. 3A illustrates the stages of compilation of a program specification to determine a corresponding sequence of machine instructions;

FIG. 3B illustrates the stages of compilation of a parallel program specification to determine multiple sequences of machine instructions for multiple processors;

FIGS. 4A–E are pseudo-code specifications of sache controller procedures for processing memory access messages from a processor;

FIG. 5 illustrates an arrangement which implements a false sharing approach; and FIGS. 6A–G are pseudo-code specification of sache controller procedures for a "writer-push" coherency protocol.

DESCRIPTION

1 ARCHITECTURE (FIGS. 1A–B, 2)

Figure 1B:
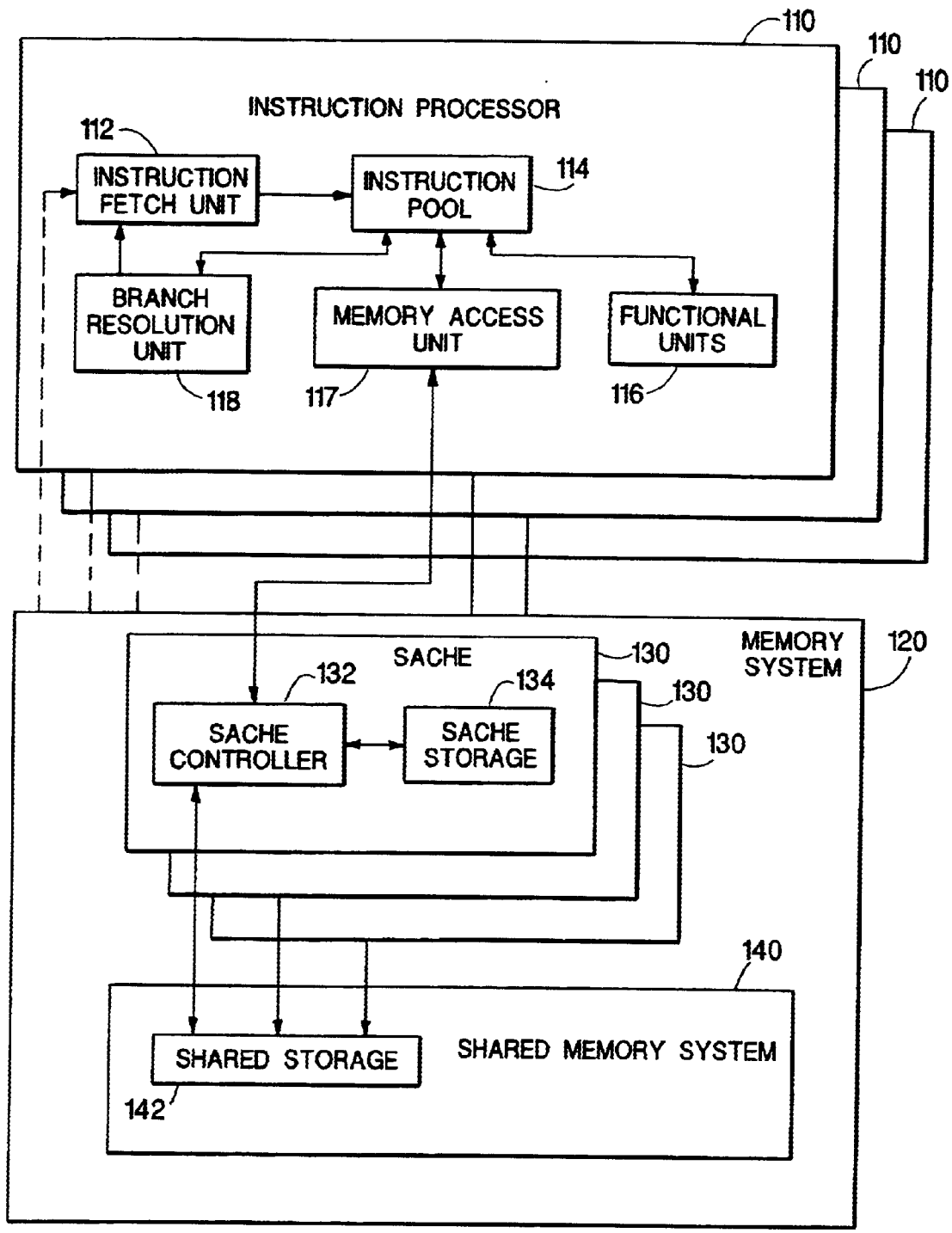
FIG. 1B illustrates the logical structure of the instruction processors and of the memory system.

Referring to FIG. 1A, a multiple processor computer system 100 embodying the invention includes multiple instruction processors 110 coupled to a memory system 120. Associated with each instruction processor 110, memory system 120 has a separate memory subsystem, a sache ("semantic cache") 130, coupled directly to the instruction processor 110 and coupled to a shared memory system 140. Each sache 130 is similar to a memory cache found in many conventional cache-based computer systems in that it provides faster memory access (lower latency) than can generally be provided by shared memory system 140 alone. In embodiments of this invention, instruction processors 110 execute memory access instructions that have semantics defined in terms of the two-layer hierarchical structure of the memory system, which is made up of saches 130 and shared memory system 140. The memory access instructions control or at least constrain when data is transferred between a sache and the shared memory system.

As is discussed further in Section 6.4.4, the logical structure shown in FIG. 1A can have one or a number of hardware implementations. For instance, instruction processors 110, saches 130 and shared memory system 140 can all be implemented using separate integrated circuits. Alternatively, each instruction processor 110 and all or a portion of its associated sache 130 can share a single integrated circuit, much as a processor core and a primary cache memory often shares a single integrated circuit of a current microprocessors.

Referring to FIG. 1B, a representative instruction processor 110 has a general structure found in many current microprocessors. An instruction fetch unit 112 retrieves stored machine instructions for a computer program from memory system 120 or from another instruction storage such as an instruction memory cache, and passes them to an instruction pool 114. Instruction fetch unit 112 processes the stored machine instructions prior to passing them to instruction pool 114, for instance renaming logical register references in a stored machine instructions to identifiers of physical storage locations within the processor. As discussed below in Section 6.1, in some alternative embodiments the processing includes expansion of each complex stored machine instruction into a series of primitive instructions that implement the functionality of that complex instruction.

Instructions in instruction pool 114 are passed to functional units 116, including, for example, an arithmetic unit, to a memory access unit 117, and to a branch resolution unit 118. Functional units 116 pass results back to instruction pool 114 where these results are typically used as operands in other pending instructions. Memory access unit 117 communicates with memory system 120, for instance to load or to store data in memory system 120. Memory access unit 117 provides the data loaded from memory system 120 to instruction pool 114 where this loaded data is typically used as an operand of another pending instruction. Branch resolution unit 118 accepts branch instructions from instruction pool 114 and provides information to instruction fetch unit 112 so that the instruction fetch unit accesses the machine instructions appropriate to flow control of the program being executed.

In general, processor 110 executes multiple instructions concurrently. Instruction pool 114 therefore may include multiple instructions that it has issued by sending them to functional units 116, memory access unit 117, or branch resolution unit 118 but that have not yet completed. Other instructions in instruction pool 114 may not yet have been issued by sending them to one of the units, for example, because the instructions require as operands the result from one of the issued instructions which will be returned by unit executing the instruction. Instruction pool 114 does not necessarily issue instructions in the order that they are provided to it by instruction fetch unit 112. Rather instructions may be issued out of order depending on the data dependencies and semantics of the instructions themselves.

Referring still to FIG. 1B, memory system 120 includes one sache 130 for each instruction processor 110, and shared memory system 140. Each sache 130 includes a sache controller 132 and a sache storage 134. Sache storage 134 includes data storage which associates address, data, and status information for a limited portion of the address space accessible from instruction processor 110. Sache controller 132 communicates with memory access unit 117. Memory access unit 117 passes memory access messages to sache controller 132 in response to memory access instructions issued by instruction pool 114. As is discussed further in Section 5.2, sache controller 132 processes these memory access messages by accessing its sache storage 134, by communicating in turn with shared memory system 140, or both. When it has finished processing a memory access message, it sends a result or acknowledgment back to memory access unit 117, which in turn signals to instruction pool 114 that the corresponding memory access instruction has completed.

Figure 2:
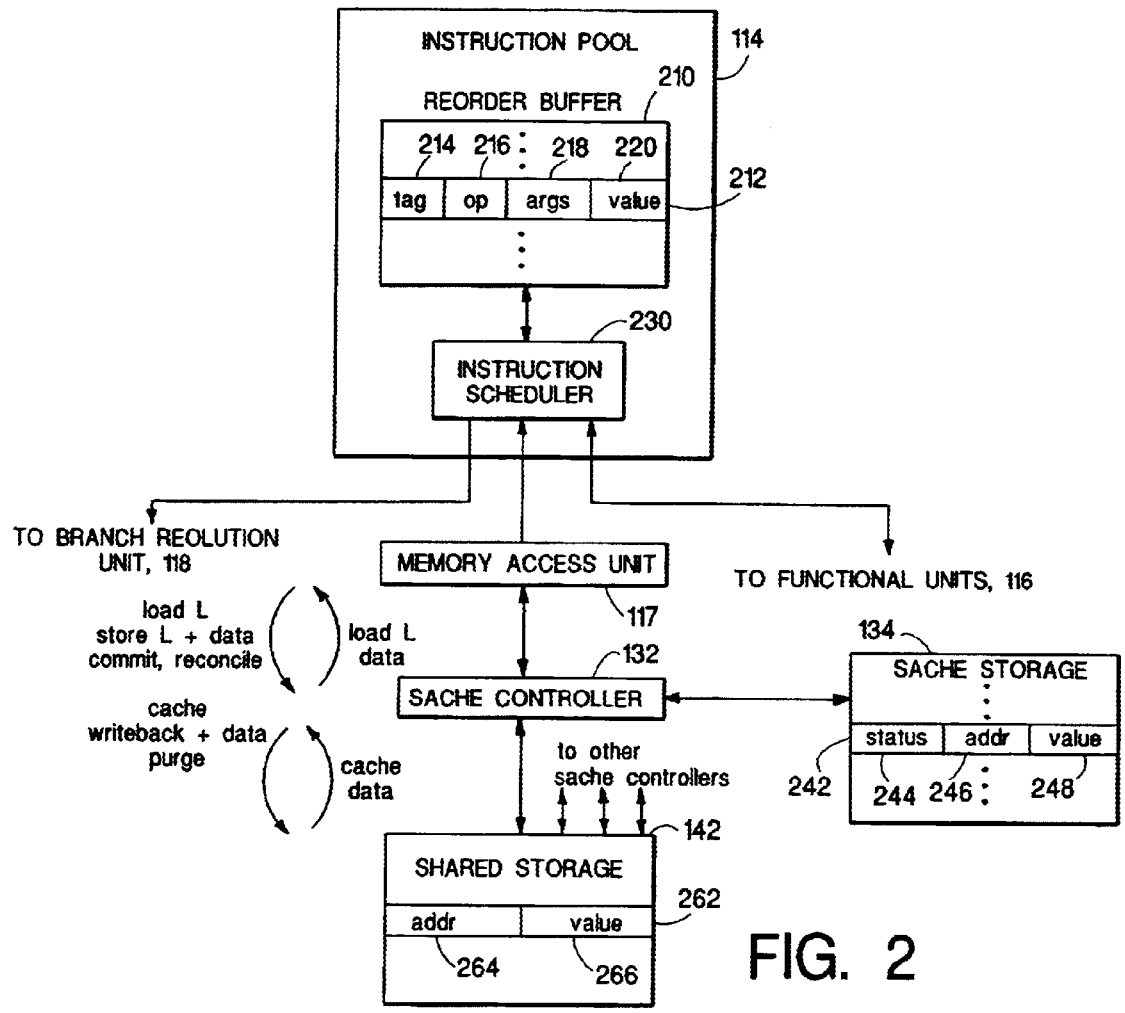
FIG. 2 illustrates communication paths used to access data storage from an instruction processor.

Referring to FIG. 2, instruction pool 114 includes a reorder buffer 210 and an instruction scheduler 230. Reorder buffer 210 holds a limited number of instructions 212 (e.g., 16 instructions) that come from instruction fetch unit 112 (FIG. 1B). Instructions are retired from reorder buffer after they are no longer needed, typically after they have completed execution or are determined not to be needed as a result of a branch instruction. In this embodiment, each instruction 212 includes a tag 214 that is unique to the instructions in reorder buffer 210, an identifier of the operation for that instruction, op 216, operands 218 for that operation, and a value 220 that results from the execution of the instruction. Other embodiments have alternative structures for instruction pool 114. For instance, rather than storing the values resulting from execution of instructions directly with the instructions in the reorder buffer, a separate memory area is used and referred to by the instructions in the reorder buffer.

Based on the semantics and availability of operands of instructions in reorder buffer 210, as well as availability of processing units, instruction scheduler 230 determines which instructions in reorder buffer 210 may be issued and sent to one of the processing units. Memory access instructions are sent to memory access unit 117 which in turn communicates with its corresponding sache controller 132.

Referring still to FIG. 2, sache storage 134 includes a limited number (e.g., 128K) of cells 242, each holding an address 246, and a value 248 and a status 244 associated with that address. Status 244 can take on the value Clean or Dirty. A cell is Clean if the value has been retrieved from shared memory system 140 and has not yet been modified by instruction processor 110. When instruction processor 110 modifies the value for an address, the status becomes Dirty. Status 244 can also take on the value cache-pending when the sache controller 132 is awaiting a value for the address from shared memory system 140, and the value writeback-pending when the sache controller has sent the value to the shared memory system, but has not yet received an acknowledgment that the value has been written and is accessible to the other processors.

In the discussion below, the notation Cell (address,value, status) is used to denote that sache storage 134 includes a cell 242 with the indicated address, value, and status. A "-" is used to indicate any value. The notation Cell(address,-, Invalid) is used to denote that there is no cell 242 with the indicated address in sache storage 134. Also, the status (or state) of an address in the sache storage refers to the status of the cell that identifies the address, or invalid if there is no such cell, and the value of an address in the sache storage refers to the value in a cell that identifies the address.

2 MEMORY INSTRUCTIONS

Embodiments of this invention make use of four primary memory access instructions. These are: LoadL ("Load Local"), StoreL ("Store Local"), Reconcile, and Commit. Generally, the LoadL and StoreL instructions control the transfer of data between sache 130 and instruction processor 110, while the Reconcile and Commit instructions control or constrain the transfer of data between sache 130 and shared memory system 140.

The semantics of these instructions is described below. Note that these semantics do not precisely define how a processor 110 implements the instructions or how memory system 120 processes requests resulting from execution of the instructions. Rather, the semantics essentially define what implementations are permissible. Therefore various embodiments of instruction processors or memory systems may operate differently while being consistent with these semantics. The semantics of the four primary memory access instructions are as follows:

| Instruction | Semantics |
| --- | --- |
| LoadL(addr) | If sache 130 includes a cell holding address addr and value val, then execution of this LoadL instruction results in the value val. If there is no cell in sache 130 holding addr, then execution of the LoadL does not complete (i.e., the instruction is stalled) until a cell for address addr is created and the value val the stored at address addr in shared memory system 140 is passed from the shared memory system to sache 130 and stored in the newly created cell in the sache. The status of that cell is set to Clean. |
| Reconcile(addr) | If sache 130 includes a cell holding address addr, that has a status Clean, that cell is purged from sache 130 such that, for instance, a subsequent LoadL addr instruction will result in a value that will have been retrieved from address addr in shared memory system 140. This subsequent LoadL is guaranteed to result in a value that was stored at address addr in the shared memory system at some time after this Reconcile instruction was issued. |
| StoreL(val, addr) | If sache 130 includes a cell holding address addr, then execution of this StoreL instruction results in the value val being stored at that cell, and the status of the cell being set to Dirty. If there is no cell in sache 130 holding addr, then a storage cell is first created for address addr. |
| Commit(addr) | If sache 130 includes a cell holding address addr that has a status Dirty, then the value at that cell is passed to shared memory system 140 and stored at address addr. If sache 130 does not hold address addr, or address addr has a status Clean, then this Commit instruction does not modify or transfer any data. |

In alternative embodiments, the Commit and Reconcile instructions can specify a set of addresses, such as an address range, rather than specify a single address. In this case, the semantics of the Commit and Reconcile instructions are the same as an equivalent sequence of instructions that each specifies a single address.

To generally illustrate the semantics of these memory access instructions, consider the case that instruction pool 114 receives a sequence of two instructions, Reconcile(addr) followed by LoadL(addr), from instruction fetch unit 112. In the case that address addr has status Clean immediately prior to the Reconcile and there are no intervening StoreL instructions to address addr between the Reconcile and the LoadL, a value stored in shared memory system 140 at address addr at a time after the Reconcile was issued is provided to the instruction pool as a result of the LoadL instruction. Similarly, if instruction pool 114 receives the sequence StoreL(val,addr) and Commit (addr), then the value val is stored at address addr in shared memory system 140 by the time that the Commit instruction completes. Note that the sequence of a Reconcile and a LoadL instruction therefore functions in a similar manner as a conventional "Load" instruction on current processors while the sequence of a StoreL and a Commit instruction functions in a similar manner as a conventional "Store" instruction.

In order to define the semantics of the memory access instructions in a multiple processor system, the allowable data transfers between a sache 130 and shared memory system 140 are governed by the following rules:

| | |
|---|---|
| Purge rule | Any cell in sache 130 that has a Clean status may be purged at any time from the sache. For example, when a new cell needs to be created, an existing cell may need to be purged in order to make room for the new cell. |
| Writeback rule | Any cell in sache 130 that has a <u>Dirty</u> status may have its data written to shared memory system 140 at any time. The status becomes Clean after the data is written. Note that a Clean cell may never be written back to the shared memory system under any circumstances. |
| Cache rule | Data in shared memory system 140 at any address addr for which sache 130 does not have an associated cell may be transferred from the shared memory system to the sache at any time. A new cell in sache 130 is created for the address and the status is set to Clean when the data is transferred. |

In multiple processor computer system 100, one processor may execute multiple StoreL and LoadL instructions for a particular address without executing an intervening Commit instruction for that address. Prior to executing a Commit instruction, that value will not necessarily be updated in shared memory system 140. After a Commit instruction is completed, then a subsequent Reconcile and Load sequence executed by another instruction processor will retrieve the Commit'ed value. Note that the value may be updated in the shared memory prior to the Commit instruction completing, for example, if the storage cell holding that address is flushed from sache 130 to free up space for a subsequently LoadL'ed address that is not already in the sache (a sache miss).

Note also that in multiple processor computer system 100, multiple saches 130 may have cells holding the same address. These cells may have different values, for instance if they each have a dirty status with different values having been LoadL'ed. The cells can also have different values even though they have Clean status. For example, one processor may have executed a Reconcile and LoadL for an address prior to the value in the shared memory system for that address being updated, while another processor executes a Reconcile and LoadL instruction for that address after the shared memory system was updated. In this example, prior to the processors updating the values in their saches with StoreL instructions causing the status to change to Dirty, each processor has a Clean value for the address, but the values are different.

Instruction pool 114 can also include instructions that constrain which instructions can be issued by instruction scheduler 230. These "fence" instructions are used to enforce the order that other memory access instructions are issued. Instruction scheduler 114 does not in fact send these instructions to memory access unit 117. The semantics of the fence instructions are as follows:

| Instruction | Semantics |
|---|---|
| Fence$_{WR}$(addr1, addr2) | All Commit(addr1) instructions prior to the Fence instruction must complete prior to any subsequent Reconcile(addr2) instruction being issued (for the particular addresses addr1 and addr2 specified in the Fence instruction) |

-continued

| Instruction | Semantics |
|---|---|
| Fence$_{WW}$(addr1, addr2) | All Commit(addr1) instructions prior to the Fence instruction must complete prior to any subsequent StoreL(addr2) instruction being issued. |
| Fence$_{RR}$(addr1, addr2) | All LoadL(addr1) instructions prior to the Fence instruction must complete prior to any subsequent Reconcile(addr2) instruction being issued. |
| Fence$_{RW}$(addr1, addr2) | All LoadL(addr1) instructions prior to the Fence instruction must complete prior to any subsequent StoreL(addr2) instruction being issued. |

In order to illustrate the semantics of the fence instructions, consider the sequence of five instructions: StoreL (val,addr1), Commit (addr1), Fence$_{WR}$(addr1, addr2), Reconcile(addr2), LoadL(addr2). In this sequence, the Reconcile instruction is not issued until the Commit instruction has completed, that is, until after val has been written to address addr1 in the shared memory. The value of the LoadL instruction is a value at address addr2 in the shared memory at a time after the Reconcile instruction was issued, and therefore at a time after val was stored at addr1 and was "visible" to other processors in the system. The Fence instructions can be used in this way to synchronize operation of multiple processors.

3 COMPILER (FIGS. 3A–B)

Referring to FIG. 3A stored machine instructions retrieved by instruction fetch unit 112 (FIG. 1B) are produced by a compiler 320. Compiler 320 processes a program specification 310, for instance in a high-level programming language such a "C", to generate a processor instruction sequence 330. The processor instruction sequence is stored in memory and is subsequently accessed by instruction fetch unit 112 (FIG. 1B) when the program is executed. Compiler 330 is typically a software-based module that executes on a general purpose computer. Compiler 320 includes a machine instruction generator 322 that takes program specification 310 and produces a machine instructions sequence 324 using a variety of well-known compilation techniques. These machine instructions make use of various machine instructions, including the memory access instructions described in Section 2, to represent the desired execution of program specification 310.

Instruction reordering and optimization stage 326 of compiler 320 reorders machine instructions 324 to produce processor instruction sequence 330. For example, compiler 320 reorders the machine instructions to achieve faster execution using a variety of well-known optimization techniques. The compiler constrains the reordering, for example, ensuring that operands are available before they are used. In addition the semantics of the memory access instructions described above further limit the allowable reorderings. Allowable reorderings are defined in terms of allowable interchanges of sequential pairs of instructions. More complex reorderings are performed (at least conceptually) as a series of these pair-wise interchanges. In general, any of the eight memory access instructions (LoadL, StoreL, Commit, and Reconcile and the four Fence instructions) can be interchanged with another of the memory instructions, subject to there not being a data dependency between the instructions, and subject to the following exceptions. The following instruction pairs cannot be interchanged when the corresponding addressed variables (addr, addr1, and addr2) in the two instructions are (or may potentially be) equal:

| Instruction [n] | Instruction [n + 1] |
|---|---|
| StoreL (addr, val) | LoadL (addr) |
| LoadL (addr) | StoreL (addr, val) |
| Reconcile (addr) | LoadL (addr) |
| StoreL (addr, val) | Commit (addr) |
| StoreL (addr, val1) | StoreL (addr, val2) |
| LoadL (addr1) | Fence$_R$· (addr1, addr2) |
| Commit (addr1) | Fence$_W$· (addr1, addr2) |
| Fence·$_W$(addr1, addr2) | StoreL (addr2, val) |
| Fence·$_R$(addr1, addr2) | Reconcile (addr2) |

In this list of exceptions, Fence$_{W*}$ is used as shorthand to represent either a Fence$_{WR}$ or a Fence$_{WW}$ instruction, and the same shorthand is used for the other Fence instructions in the list.

Using these reordering constraints an instruction reordering and optimization stage 326 of compiler 320 reorders machine instructions 324 to produce processor instruction sequence 330. Note that since certain addresses of memory operations may not be completely resolved at compile time, for example when the address is to be computed at run time, certain instruction reorderings are not performed by the compiler since they may potentially be not allowed depending on the actual addresses of those instructions that will be determined at run-time. However, even if the addresses are not completely resolved and known exactly, the compiler may be able to determine that two addresses are certain to be unequal thereby allowing some instruction reorderings to be nevertheless performed.

Referring to FIG. 3B, a similar compiler structure is used to process a parallel program specification 340. Parallel compiler 350 includes a machine instruction generator 352 that generates multiple sequences of machine instructions 324, each for execution on different instruction processors 110 (FIGS. 1A–B). Machine instruction generator 352 makes use of the new instructions to specify data transfer and process synchronization between the processors. Each of the machine instruction sequences is independently reordered by an instruction reordering and optimization stage 326 to produce machine instruction sequences 330.

4 INSTRUCTION SCHEDULING AND EXECUTION (FIGS. 1B, 2)

Referring to FIG. 2, when a program is executed, the stored machine instruction sequence is provided to instruction pool 114 from instruction fetch unit 112. As instructions are provided by the instruction fetch unit and as issued instructions complete execution, instruction scheduler 230 determines which instructions stored in reorder buffer 210 may be issued, and in the case of memory access instructions, sends those instructions to memory access unit 117. Instruction scheduler 230 considers each instruction stored in reorder buffer 210 in turn to determine whether it may be issued. If an instruction depends on the result of a pending instruction for its operands, it is not issued. Another typical constraint is that an instruction cannot be issued if the functional unit it requires is busy. Furthermore, a memory access instruction for an address is not issued until any previously issued instruction using that address has completed.

Instruction scheduler 230 applies essentially the same constraints on memory access instruction reordering as is described in the context of compiler optimization described in Section 3 above. For instance, instruction scheduler 230 does not issue a LoadL(addr) instruction if a prior StoreL (addr,val) has not yet been issued and completed for the same address addr. Furthermore, the LoadL(addr) instruction is not issued if a prior unissued StoreL(addr',val) instruction has not yet had the value of addr' determined, since addr' may indeed be equal to addr. Similarly, instruction scheduler 230 does not issue a Reconcile(addr2) instruction if a prior Fence·$_R$(addr1, addr2) instruction has not yet been issued and completed.

Referring back to FIG. 2, memory access unit 117 communicates with sache controller 132 in response to receiving memory access instructions issued by instruction scheduler 230. Note that an instruction 212 passed from instruction scheduler 230 to memory access unit 117 includes its tag 214. Memory access unit 117 passes this tag along with the instruction in a message to sache controller 132. Memory access unit 117 then later matches a return message from the sache controller, which contains the tag along with an acknowledgement or return data, based on the tag. The message types passed from memory access unit 117 to sache controller 132 correspond directly to the four primary memory access instructions. The messages and their expected responses messages are as follows:

| Message | Response |
|---|---|
| <tag, LoadL(addr)> | <tag, value> |
| <tag, Reconcile(addr)> | <tag, Ack> |
| <tag, StoreL(val, addr)> | <tag, Ack> |
| <tag, Commit(addr)> | <tag, Ack> |

In each case, memory access unit 117 sends a message to sache controller 134 after receiving a corresponding instruction from instruction scheduler 114. After memory access unit 117 receives a matching response message from sache controller 134, it signals to instruction scheduler 114 that the instruction has completed execution, allowing the instruction scheduler to issue any instructions waiting for the completion of the acknowledged instruction.

Note that the Fence instructions do not necessarily result in messages being passed to the memory system 120. Instruction scheduler 114 uses these instructions to determine which memory access instructions may be sent to memory access unit 117. However, the fence instructions are not themselves sent to the memory access unit, nor are they sent from the memory access unit to the memory system.

In the discussion below, the tags used to match returned values and acknowledgments to the original command messages are not explicitly indicated to simplify the notation.

5 MEMORY SYSTEM (FIGS. 1B, 2, 4A–E)

5.1 Structure (FIGS. 1B, 2)

Referring back to FIG. 1B, and as described briefly above, memory system 120 includes a number of saches 130 each coupled to shared memory system 140. Each sache has a sache controller 132 coupled to its sache storage 134. Shared memory system 140 has a shared storage 142 used to store data accessible to all the processors.

Referring again to FIG. 2, shared storage 142 includes a number of cells 262, each associating an address 264 with a value 266. Typically, the address 264 is not explicitly stored being the hardware address of the location storing the value in a data storage device.

Sache controller 132 sends messages to shared memory system 140 in order to pass data or requests for data to shared storage 142. These messages are:

| Message | Description |
|---|---|
| Writeback(val, addr): | pass val from sache controller 132 to shared memory system 140 and store val in the shared storage at address addr. Shared memory system 140 sends back an acknowledgement of this command once val is stored at addr in the shared storage and is visible to other processors. |
| Cache-Request(addr): | request that the value stored at address addr in shared memory system 140 be sent to sache controller 132. After the shared memory system can provide the value, val, it sends a Cache(val) message back to the sache controller. |

5.2 Operation (FIGS. 4A–E)

In this embodiment, sache controller 132 responds directly to messages from memory access unit 117 in a manner that is consistent with the semantics of the memory access instructions. Note that several alternative modes of operation, which may incorporate features that provide improved memory access performance (e.g., smaller average access time), also satisfy these memory semantics. Some of these alternative modes of operation are described in Sections 6.3 and 6.4.

Sache controller 132 begins processing each received message from memory access unit 117 in the order that it receives the messages, that is, in the order that the corresponding instructions were issued by instruction scheduler 230. Sache controller 132 may begin processing a message prior to a previous message being fully processed, that is, the processing of multiple messages may overlap in time, and may be completed in a different order than they were received.

Referring to the pseudo-code in FIGS. 4A–E, cache controller 132 processes messages from memory access unit 117 as follows:

LoadL(addr) When cache controller 132 receives a LoadL (addr) from memory access unit 117, it executes a procedure 410 shown in FIG. 4A. If the address is invalid (line 411), that is, if sache storage 134 does not include a cell for address addr is in its sache storage 134, it first creates a new cell for that address (line 412) using a procedure shown in FIG. 4E and described below. Sache controller 132 then sends a Cache-Request message for the newly created cell (line 413) and waits for a return Cache message (line 414), which has the value stored in the shared memory system at that address. The sache controller sets the value in the sache storage cell to the returned value, and the status to Clean (line 415). It then returns the retrieved value (line 416). In the case that the sache storage has a cell for the requested address (line 417), it immediately returns the value stored in that cell (line 418) to memory access unit 117.

Reconcile(addr) When sache controller 132 receives a Reconcile(addr) message from memory access unit 117, it executes a procedure 430 shown in FIG. 4B. First, it checks to see if it has a cell associated with address addr and with a status Clean (line 431). If it does, it deletes that cell from its sache storage (line 432). In any case, it then returns an acknowledgment to memory access unit 117 (line 434). A subsequent LoadL message will therefore access the shared memory system.

StoreL (addr,val) When sache controller 132 receives a StoreL(addr,val) message from memory access unit 117, it executes a procedure 460 shown in FIG. 4C. In this procedure, the sache controller first checks to see if it has a cell associated with address addr (line 461). If it does not, it first creates a cell in sache storage 134 (line 462). If it already has a cell for address addr, or after it has created a new cell for that address, sache controller 134 then updates the cell's value to val and sets the status to Dirty (line 464). Then, it sends an acknowledgment message back to memory access unit 117 (line 465).

Commit(addr) When sache controller 132 receives a Commit(addr) message from memory access unit 117, it executes a procedure 470 shown in FIG. 4D. The sache controller first checks to see if it indeed has a cell for address addr and that, if it does, that the status is Dirty (line 471). If these conditions are satisfied, it sets the status of the cell to Writeback-Pending (line 472) and sends a Writeback message to the shared memory system (line 473). The sache controller then waits for an acknowledgment message from the shared memory system in response to the Writeback message (line 474). When it has received the acknowledgment, it sets the cell's status to Clean (line 475) and returns an acknowledgment to memory access unit 117 (line 477).

When sache controller 132 needs to create a new cell in sache storage 134, it executes a procedure 480 shown in FIG. 4E. If there is no space available in the sache storage (line 481) it first flushes another cell in the storage. The sache controller selects a cell that holds another address addr' such that the status of addr' is either Clean or Dirty (line 482). It selects this cell according to one of a variety of criteria, for example, it selects the cell that has been least recently accessed. If the cell's status is Dirty (line 483), it first sends a Writeback message for that cell (line 484) and waits from an acknowledgment from the shared memory system (line 485). After it has received the acknowledgement, or if the cell was Clean, it then deletes that cell (line 487). If there was space already available in the sache storage, or storage was created by deleting another cell, the sache controller then sets an available cell to the requested address (line 489).

In this embodiment, shared memory system 140 processes Cache-Request and Writeback messages from sache controllers 132 in turn. It sends a value stored in its shared storage in a Cache message in response to a Cache-Request message, and sends an acknowledgment in response to a Writeback message after it has updated its shared storage.

In the discussion that follows regarding alternative memory protocols, operation of the memory system in this embodiment is referred to as the "Base" coherency protocol. Several alternative coherency protocols which maintain the semantics of the memory access instructions are presented below.

6 OTHER EMBODIMENTS

Several other embodiments of the invention include alternative or additional features to those described above.

Unless otherwise indicated below, the semantics of the memory access instructions described in Section 2 remain unchanged in these other embodiments.

6.1 Instruction Fetch Unit

Referring back to FIG. 1B, instruction fetch unit 112 accesses a sequence of stored machine instructions such as machine instruction sequence 330 (FIG. 3A) produced by compiler 320 (FIG. 3A). The sequence of machine instructions includes memory access instructions that are described in Section 2.

In an alternative embodiment, the compiler produces a machine instruction sequence that includes conventional Load and Store instructions. These instructions have conventional semantics, namely, that the Load instruction must retrieve the value stored in the shared memory system, or at least a value known to be equal to that stored in the shared memory system, before completing. Similarly, a Store instruction must not complete until after the value stored is in the shared memory system, or at least that the value would be retrieved by another processor executing a Load instruction for that address.

In this alternative embodiment, when instruction fetch unit 112 processes a conventional Load instruction, it passes two instructions to instruction pool 114, a Reconcile instruction followed by a LoadL instruction. Similarly, when instruction fetch unit 114 processes a Store instruction, is passes a StoreL followed by a Commit instruction to instruction pool 114.

Instruction scheduler 230 (FIG. 2) then issues the instructions according to the semantic constraints of the LoadL, StoreL, Commit, and Reconcile instructions, potentially allowing other instructions to issue earlier than would have been possible if the conventional Load and Store instructions were used directly.

6.2 Memory Access Instructions

In another alternative embodiment, alternative or additional memory access instructions are used. In particular, these instructions include alternative forms of fence instructions, synchronization instructions, and load and store instructions with attribute bits that affect the semantics of those instructions.

6.2.1 Coarse-Grain Fence Instructions

In addition or as an alternative to the Fence instructions described in Section 2, "course-grain" fence instructions enforce instruction ordering constrains on a pair of address ranges rather than a pairs of individual addresses. For example a $Fence_{RW}$(AddrRange1,AddrRange2) instruction ensures that all LoadL(addr1) instructions for any address addr1 in address range AddrRange1 complete before any subsequent StoreL(addr2) instruction for any address addr2 in address range AddrRange2 is issued. This course grain fence can be thought of conceptually as a sequence of instructions $Fence_{RW}$(addr1,addr2) for all combinations of addr1 and addr2 in address ranges AddrRange1 and AddrRange2 respectively. The other three types of course-grain Fence instructions (RR, WR, WW) with address range arguments are defined similarly.

Other course-grain fence instructions have a combination of an address range and a specific single address as arguments. Also, an address range consisting of the entire addressable range is denoted by "*". Various specifications of address ranges are used, including for example, an address range that is specified as all addresses in the same cache line or on the same page as a specified address, and an address range defined as all addresses in a specified data structure.

Two addition Fence instructions are defined in terms of these course-grain fences. These are:

$PreFence_W$(addr)=$Fence_{RW}$(*, addr); $Fence_{WW}$(*, addr)

$PostFence_R$(addr)=$Fence_{RR}$(addr, *); $Fence_{WW}$(addr,*)

Generally, PreFenceW(addr) requires that all memory access instructions before the fence be completed before any StoreL(addr) after the fence can be issued. Similarly, PostFenceR(addr) requires that any LoadL(addr) before the fence be completed before any memory access after the fence can be performed.

6.2.2 Synchronization Instructions

Additional memory access instructions useful for synchronizing processes executing on different instruction processors 110 are used in conjunction with the instructions described in Section 2. These include mutex P and V instructions (wait and signal operations), a test-and-set instruction, and load-reserved and store-conditional instructions, all of which are executed as atomic operations by the memory system.

The mutex instuction P(lockaddr) can be thought of as functioning somewhat both as a conventional Load and a conventional Store instruction. Instruction scheduler 230 effectively decides to issue a P instruction somewhat as if it were a sequence of Reconcile, LoadL, StoreL, and Commit instructions for address lockaddr, although the P instruction remains an atomic memory operation. The semantics of the P instruction are such that it blocks until the value at lockaddr in the shared memory system becomes non-zero at which point the value at lockaddr is set to zero and the P instruction completes. The V(lockaddr) instruction resets the value at address lockaddr in the shared memory system to 1. One implementation of this instruction involves memory access unit 117 sending a P(lockaddr) message to sache controller 132. Sache controller 132 treats the message as it would a Reconcile followed by a LoadL message, that is, it purges any cell of holding lockaddr in sache storage 134. Sache controller 132 then sends a P(lockaddr) message to shared memory system 140. When the requesting processor acquires the mutex at lockaddr, shared memory system 140 sends back an acknowledgement to sache controller 132, which updates sache storage 134 for lockaddr, and sends an acknowledgement message back to memory access unit 117. The mutex instruction V(lockaddr) functions as a sequence of a StoreL and a Commit from the point of view of instruction scheduler 230. The V instruction does-not complete until after the shared memory system has been updated.

A Test&Set instruction also functions somewhat like a sequence of a conventional Load and Store instruction. Instruction scheduler 230 issues a Test&Set(addr,val) instruction as if it were a sequence of a Reconcile, a Load, a Store, and a Commit instruction. Memory access unit 117 sends a Test&Set(addr,val) message to sache controller 132. Sache controller sends a corresponding Test&Set(addr,val) message to shared memory system 140, which performs the atomic access to address addr, and passes the previous value stored at that address back to sache controller 132. Sache controller 132 updates sache storage 134 and passes the previous value in a return message to memory access unit 117.

The functionality of a conventional Load-Reserved (also known as Load-Linked) instruction and a corresponding Store-Conditional instruction is implemented using a Reconcile-Reserved and Commit-Conditional instructions. A Reconcile-Reserved instruction functions as a Reconcile instruction described in Section 2. However, in addition, in response to a Load-Reserved(addr) message, sache controller 132 passes a message to shared memory system 140 so that the shared memory system sets a reserved bit for the address, or otherwise records that the address is reserved. A subsequent Commit-Conditional instruction fails if the reserved bit has been reset in the shared memory system.

In other alternative embodiments which use these and similar synchronization instructions, instruction fetch unit 112 expands the synchronization instructions into semantically equivalent sequences of LoadL, StoreL, Commit, Reconcile, and Fence instructions, as is described in Section 6.1.

6.2.3 Instruction Attributes (Bits)

In another alternative embodiment, alternative memory access instructions are used by processors 110 which do not necessarily include explicit Reconcile, Commit, and Fence instructions, although these alternative instructions are compatible (i.e., they have well defined semantics if both are used) with those explicit instructions. By including the attribute bits, fewer instructions are needed, in general, to encode a program. Store and Load instructions each have a set of five attribute bits. These bits affect the semantics of the Load and Store instructions, and effectively define semantically equivalent sequences of instruction.

The Load(addr) instruction has the following attribute bits which, when set, affects the semantics of the Load instruction as follows:

| Bit | Equivalent Semantics |
|---|---|
| PreR | $Fence_{RR}$(*, addr); LoadL(addr) |
| PreW | $Fence_{WR}$(*, addr); LoadL(addr) |
| PostR | LoadL(addr); $Fence_{RR}$(addr, *) |
| PostW | LoadL(addr); $Fence_{RW}$(addr, *) |
| Rec | Reconcile(addr); LoadL(addr) |

Any subset of the bits can be set although some combinations are not useful. In alternative embodiments, the attributes are not encoded as a set of bits each associated with one attribute, but rather the attributes are encoded using an enumeration of allowable combinations of attributes. In this embodiment, a Load instruction with all the bits set, which is denoted as Load(addr)[PreR,PreW,PostR,PostW,Rec], is semantically equivalent to the sequence $Fence_{RR}$(*, addr); $Fence_{WR}$(*, addr) Reconcile (addr); LoadL (addr); $Fence_{RR}$(addr,*); $Fence_{RW}$(addr,*).

Similarly, the Store(addr,val) instruction has the following attribute bits:

| Bit | Equivalent Semantics |
|---|---|
| PreR | $Fence_{RW}$(*, addr); StoreL(addr, val) |
| PreW | $Fence_{WW}$(*, addr); StoreL(addr, val) |
| PostR | StoreL(addr, val); $Fence_{WR}$(addr, *) |
| PostW | StoreL(addr, val); $Fence_{WW}$(addr, *) |
| Com | StoreL(addr, val); Commit(addr) |

Other memory access instructions can also have similar attribute bits. For instance, synchronization instructions which function essentially as both Load and Store instructions, such as the Mutex P instruction, have the following semantics:

| Bit | Equaivalent Semantics |
|---|---|
| PreR | $Fence_{RR}$(*, addr); P(addr) |
| PreW | $Fence_{WR}$(*, addr); P(addr) |
| PostR | P(addr); $Fence_{WR}$(addr, *) |
| PostW | P(addr); $Fence_{WW}$(addr, *) |
| Com | P(addr); Commit(addr) |
| Rec | Reconcile(addr); P(addr) |

6.2.4 Alternative implementations of Fence instructions

In the implementations of Fence instructions described above, in general, the instruction scheduler is responsible for ensuring that instructions are executed in a proper order. Neither the memory access unit, nor the memory system must necessarily enforce a particular ordering of the instructions they receive.

In an alternative embodiment, the instruction scheduler delegates some of the enforcement of proper ordering of memory operations to the memory access unit. In particular, the instruction scheduler sends multiple memory access instructions to the memory access unit. These memory access instruction can include Fence instructions, which have the syntax described above. The memory access unit is then responsible for delaying sending memory access messages to the memory system for certain instructions received after the Fence instruction until it receives acknowledgment messages for particular memory access instructions it received prior to the Fence instruction, in order to maintain the correct semantics of the overall instruction stream.

In yet another alternative embodiment, the memory access unit does not necessarily enforce ordering of messages to the memory system. Rather, when it receives a Fence command from the instruction scheduler, it sends a Fence message to the memory system. The memory system is responsible for maintaining the appropriate ordering of memory operations relative to the received Fence message.

6.2.5 Other alternatives

The embodiments described above include both Commit and Reconcile instructions as well as Fence instructions. Fence instructions are not required in a system using Commit and Reconcile instructions. Similarly, Fence instructions of the types described above, or equivalently attribute bits (PreR, PreW, PostR, PostW) that are semantically equivalent to Fence instructions can be used without the Commit and Reconcile instructions. Also, conventional Load and Store instructions can coexist with Commit and Reconcile instructions. For example, Load and Store instructions can be expanded by instruction fetch unit 112 (FIG. 1B) as described in Section 6.1.

6.3 Memory System

Alternative embodiments of memory system 120 provide memory services to instruction processors 110 while preserving the desired execution of programs on those processors.

6.3.1 Sache Controller

In Section 2, three rules governing allowable data transfers between a sache and the shared memory system, namely, Purge, Writeback, and Cache, were.described. The description in Section 5.2 of operation of an embodiment of sache controller 132 essentially applies these rules only when they are needed to respond to a memory access message from memory access unit 117. Alternative embodiments of sache controller 132 use other strategies for applying these rules, for example, to attempt to provide faster memory access by predicting the future memory request that an instruction processor will make.

These alternative embodiments use various heuristics in applying these rules. Examples of these heuristics include:

Apply the Writeback rule for Dirty cells that are not expected to be modified by a StoreL instruction in the near future. In this way, a subsequent Commit instruction for that cell will complete without having to first performing a writeback to the shared memory system. Also, if this cell is needed to free space for a new address, then the cell's value does not have to be written back before using the cell for the new address.

Apply the Cache rule for addresses that have had Reconcile instructions executed but have not yet had LoadL instructions executed, but that are likely to be needed in the near future. For example, when a LoadL instruction references a particular address, the Cache rule is applied to adjacent addresses anticipating future LoadL instructions.

6.4 Alternative Memory System Protocols

In alternative embodiments, instruction processors 110 operate in the manner described in Section 4. As in the previously described embodiments, the memory system in these alternative embodiments is made up of a hierarchy of saches coupled to a shared memory system. However, the saches and the shared memory system use somewhat different coherency protocols compared to that described in Section 5.2.

6.4.1 "Writer push" (FIGS. 6A–G)

In the first alternative coherency protocol, the memory system generally operates such that Clean copies of a particular address in one or more saches is kept equal to the value in the shared memory system for that address. This alternative makes use of a directory in the shared memory system which keeps track of which saches have copies of particular addresses.

The sache controller operates as is described in Section 5.2 with the following general exceptions. First, when the sache controller removes a cell from its sache storage, it sends a Purged message to the shared memory system. The shared memory system therefore has sufficient information to determine which saches have copies of a particular location. Second, when the sache controller receives a Reconcile message from the instruction processor and that location is in the sache storage, then the sache controller immediately acknowledges the Reconcile and does not purge the location or send a Cache message to the shared memory system.

Referring to the pseudo-code in FIG. 6A, when the sache controller receives a LoadL(addr) message to the memory access unit, if address addr is Invalid (line 611), then it creates a cell for that address (line 612) and sends a Cache-Request(addr) message to the shared memory system (line 613). The sache controller then stalls the LoadL instruction until the Cache message is returned from the shared memory system (line 614). It then gets that value that was returned from the shared memory system (line 615) and returns the value to memory access unit 117 (line 616). If on the other hand the sache storage has either a Clean or Dirty cell for address addr, it returns the value immediately to the memory access unit (line 618).

Referring to FIG. 6B, when the sache controller receives a Reconcile(addr) message, it immediately acknowledges it (line 631). Note that is in contrast to the processing in the Base protocol where addr would be invalidated causing a subsequent LoadL to retrieve a value from the shared memory system.

Referring to FIG. 6C, when the sache controller receives a StoreL(addr,val) message, it first checks to see whether address addr is Invalid (line 641). If it is, it first creates a cell for that address (line 642). Prior to writing a value into that cell, it sends a Cache-Request(addr) message to the shared memory system and stalls the StoreL processing until the Cache message is returned from the shared memory system. If the address was not Invalid, or after Cache message is received, the sache controller sets the value to val and status to Dirty of addr's cell (line 646).

Referring to FIG. 6D, when the sache controller receives a Commit(addr) message, it first checks that addr is Dirty (line 651). If it is, it sets the status of that address to Writeback-Pending (line 652) and sends a Writeback(addr, val) message to the shared memory system (line 653). It then stalls processing of the Commit message until a Writeback ack is received from the shared memory system (line 654). It then sets the status of the cell to Clean (line 655).

Referring to FIG. 6E, when the sache controller receives a Cache(addr,val) message from the shared memory system, it first checks to see it the address is Invalid (line 671). If it is, then it creates a new cell for that address (line 672) and sets the value to the value val received in the Cache message and the status to Clean (line 673). If on the other hand, the status of the address is Cache-Pending (line 674), for instance as a result of a previous LoadL or StoreL instruction, then the sache controller sets the value to the received value, sets the status to Clean (line 675), and restarts the stalled LoadL or StoreL instruction (line 676).

Referring to FIG. 6F, when the sache controller receives a Writeback-Ack(addr) message, then if the status of addr is Writeback-Pending (line 681), then it sets the status to Clean (line 682) and restarts the stalled Commit processing (line 683).

When the sache controller receives a Writeback-Ack-Flush(addr) message, it processes the message as in the Writeback-Ack(addr) case, but in addition, it deletes the cell for address addr. As will be seen below, this message is used to maintain coherency between the sache and the shared storage.

Sache controller can also receive a Purge-Request(addr) message from the shared memory system. This message is not in response to any message sent from the sache controller to the shared memory system. As will be described below, the shared memory system uses the Purge-Request messages to maintain coherency between processors. Referring to FIG. 6G, when the sache controller receives a Purge-Request(addr) message, it first checks if that address is Clean (line 691). If it is, it deletes the cell (line 692) and sends a Purged(addr) message back to the shared memory system. If the address is Dirty (line 694), it sends a Writeback(addr) message back to the shared memory system.

Turning now to the processing in the shared memory controller of the shared memory system, when the shared memory controller receives a Writeback message from a sache for a particular address, the shared memory system does not immediately update its storage since if it did, other saches with Clean copies would no longer have a consistent value with the shared memory system. Instead of immediately updating the shared storage, the shared memory controller sends a Purge-Request message for that location to all other saches that have previously obtained a copy of that location from the shared memory system and for which the shared memory system has not yet received a Purged message. Shared memory system maintains a directory which has an entry from each location that any sache has a copy of, and each entry includes a list of all the saches that have copies.

As described above, in response to a Purge-Request from the shared memory system, a sache responds with either a Purged message if it had a clean copy which it purges from its sache storage, or replies with an Is-Dirty message if it has a dirty copy of the location.

After receiving a Writeback message from a sache, and sending Purge-Request messages to all other saches that have copies of the location, the shared memory system waits until it receives either a Writeback or a Purged message from each of these saches at which point it acknowledges the Writeback messages. One sache receives a Writeback-Ack message while the others receive Writeback-Ack-Flush messages. The sache that receives the Writeback-Ack message corresponds to the sache that provided the value that is actually stored in the shared storage. The other saches receive Writeback-Ack-Flush messages since although they have written back values to the shared memory, they are now inconsistent with the stored value.

6.4.2 "Migratory"

In the second alternative coherency protocol, one sache at a time has "ownership" of an address, and the ownership of that address "migrates" from one sache to another. No other sache has any copy whatsoever of that address.

The sache that has a copy of a location responds to Commit and Reconcile messages for that location from its instruction processor without communicating with the shared memory system. Prior to purging a location, the sache sends a Writeback message if the location has been Committed, and then sends a Purged message.

When the shared memory system receives a Cache message from a sache and another sache has a copy of the requested location, then the shared memory system sends a Flush-Request message to that other sache. If that sache has a clean copy deletes the copy and sends a Purged message back to the shared memory system. If it has a Dirty copy that has not been written back, it sends a Flushed message, which is semantically equivalent to a Writeback message and a Purged message. After the shared memory system receives the Flushed message, it updates the memory and responds to the original Cache request, noting which sache now has a copy of that location.

6.4.3 Mixed and adaptive cache protocols

A number or alternative cache protocols use a combination of modified versions of the above protocols. In one such alternative, some saches interact with the shared memory system using essentially the base protocol, while other saches interact with the shared memory system according to the writer push protocol. In a first variant of this approach, each processor uses the same protocol for all addressed and the choice of protocol is fixed. In a second variant, the choice of protocol may depend on the particular address, for example, some addresses at one sache may use the base protocol while other addresses may use the writer push protocol. In a third variant, the choice is adaptive. For example, a sache may request that address be serviced according to the writer push protocol, but the shared memory system may not honor that request and instead reply with service according to the base protocol.

In the first variant all addresses at a first set of saches, the base protocol set, are services according to the base protocol while all addresses at a second set of saches, the writer push set, are services according to the writer push protocol. As in the pure writer push protocol, the shared memory is maintained to be consistent with Clean cells in the writer push set of saches and interactions between the shared memory and the writer push saches follow the writer push protocol.

When a sache in the base protocol set of saches writes back a value to the shared memory, then the saches in the writer push set of saches must be notified. Therefore, as in the writer push protocol, the memory controller sends Purge-Request messages to all the writer push saches that have copies of the location, the shared memory system waits until it receives either a Writeback or a Purged message from each of these saches at which point it acknowledges the Writeback messages with Writeback-Ack-Flush messages. The sache that receives the Writeback-Ack message corresponds to the base protocol sache that provided the value that is actually stored in the shared storage.

In the second variant, a different set of base protocol saches and writer push sashes is defined for each address.

In the third variant, when a sache sends a Cache-Request message to the shared memory, it indicates whether it wants that address as a base protocol sache or a writer push sache. If the shared memory receives a request for an address under the writer push protocol, it may choose to not honor that request. For instance, it may not have any remaining entries in the directory for that address in which case it provides a Cache message that indicates that the value is being provided under the base protocol. Otherwise, if a writer push cell is requested, it may add that sache to the directory as in the writer push protocol, and return a cache value that indicates that it is under the writer push protocol. Also, the shared memory can optionally request that a sache give up a writer push cell by requesting it to Purge that cell. In this way, the shared memory can free an entry in its directory.

Other alternative embodiments allow some addresses to have some saches serviced according to the base protocol and other saches serviced according to the writer push protocol, while other addresses have some saches serviced according to the base protocol and other saches serviced according to the migratory protocol.

6.4.4 "False sharing" (FIG. 5)

In general, in the embodiments described above, data transfers between an instruction processor 110 and its sache 130, and those between a sache 130 and shared memory system 140 have the same size. However, it is often desirable for instruction processor 110 to address smaller units (e.g., bytes) while transfers between sache 130 and shared memory system 140 are in units of entire "cache lines" made up of multiple (e.g, 64 or more) bytes.

Referring to FIG. 5, in an alternative embodiment of such a system, which uses a variant of the writer push protocol, instruction processor 110 addresses memory units of one particular size or smaller (e.g., 8 bytes or fewer), which we will call "words" in the following discussion, and transfers between sache 130a and shared memory system 140a are in units of multiple words or greater (e.g, 4 or more words), which we will call "cache lines."

Sache 130a includes a sache controller 132a and a sache storage 134a as in the previously described embodiments. However, each cell 242a in sache storage 134a is associated with an entire cache line, which includes multiple values 248, rather than with an individual value. Sache controller 132a maintains a status 244 for each cache line at rather than for each word.

In operation, sache controller 132a functions similarly to the operation of sache controller 132 described in Section 5.2. However, a cell is Dirty if any one of the values in the cell is updated. Also, when sache controller 132a passes data to shared memory system 140a, it sends a Writeback(addr, val1..valn) message to shared memory system 140a that includes an entire cache line rather than an individual word. Furthermore, when sache controller 132a deletes a cache line from its sache storage 134a (e.g., in processing a Reconcile message (line 432 in FIG. 4B) or creates a new cell (line 487 in FIG. 4E), it additionally sends a Purged (addr) message to the shared memory system. When sache controller 132a processes a StoreL message for an address that is not in its cache, it sends a Cache-Request message to the shared memory system to retrieve the appropriate cache line that includes the address. By keeping track of Cache-Request and Purged messages from the saches 130a, shared memory system 140a keeps track of which saches include copies of a particular cache line. Note however, that the shared memory system does not necessarily know whether the status of each of copies is Clean or Dirty. The method of maintaining these stated values is described below.

Shared memory system 140a includes shared storage 142. In addition shared memory system 140a includes a directory 500 that has multiple directory entries 510, one for each cache line that is in any sache storage 134a. Each directory entry 510 includes the address of the cache line 520, and a number of processor identifiers 530 that identify the processors (or equivalently the saches) that have cached but not yet written back or purged the cache line. After the shared memory system receives a writeback for a cache line, a "twin" cache line 540 is created for that directory entry. Initially, the value of that twin cache line is the same as the value stored in the shared memory system prior to receiving the first writeback. That is, it is the value that was provided to each of the saches that are identified in the directory entry for that cache line.

Shared memory system 140a includes a shared memory controller 141a. When shared memory controller 141a receives a Cache-Request message from one of the sache controllers 132a for a cache line that is not in its directory 500, it first creates a directory entry 510, sets processor identifier 530 to identify the sache controller that sent the Cache-Request command, and sends a Cache message which includes the current value of the cache line to the sache controller that issued the Cache-Request command.

Prior to receiving a Writeback command for that cache line from any sache 130a, shared memory controller 141a continues to immediately respond to Cache-Request messages from other sache controllers by sending the value of the cache line in shared storage 142 and adding the additional processors to the list of processor identifiers 530 in the directory. At this point, shared memory system 140a is ignorant of whether any of the saches contain a Dirty copy of the cache line resulting from a StoreL instruction that may have modified one or more words of the cache line. In fact, different instruction processors may have dirtied different words in the cache line.

At some point, one of the saches that has received the cache line in response to one of the previous Cache-Request commands may send a Writeback message back to the global memory with an updated value, for instance as a result of processing a Commit instruction for one of the locations in the cache line, or as a result of purging the cache line to free cache storage. Even if the processor has only modified one word of the cache line, the entire cache line is sent back in the Writeback message. On this first Writeback message for the cache line, shared memory controller 141a creates twin cache line 540. The cache controller updates the cache line in the shared storage (but not in twin cache line 540) and removes the processor identification 530 for the sache that sent the Writeback message. The shared memory controller holds up the acknowledgment of the Writeback command until all processors identifiers 530 are removed from the directory for that cache line.

When a second or subsequent sache sends back a Writeback command, shared memory controller 141a compares the returned value of each word in the cache line with the value of that word in twin cache line 540. If it is different, then that word must have been modified in the sending sache, and the shared memory controller modifies that word of the shared memory system. The processor is removed from the list of processors in the directory entry for that cache line. As with the first Writeback, the acknowledgment of the second and subsequent Writeback messages is held up until all processors are removed from the directory for that cache line.

If the shared memory controller receives a Purged message from one of the processors listed in the directory entry, it removes that processor from the directory entry.

If shared memory controller 141a receives a Cache-Request message from another sache after it has already received one or more Writeback messages, that Cache-Request message is not serviced (i.e., not replied to) until all processors are removed from the directory as a result of Writeback or Purge commands.

When the last pending processor has been removed from the directory entry as a result of Writeback and Purged messages, all pending acknowledgements of the Writebacks are sent and the shared storage 262 for that cache line is updated with the staged value. If more than one writeback was received, Writeback-Ack-Flush acknowledgments are sent to the saches, otherwise a Writeback-Ack is sent. The twin cache line for the entry is also destroyed, and all pending Cache-Request commands for that cache line are then serviced by the shared memory controller.

In an alternative embodiment of false sharing, rather than having a twin storage for a cache line, directory entry 510 has a bit mask for the cache line, one bit for each word in the cache line. Initially, all the bits are cleared. As Writeback commands provide modified values of words in the cache line, only the words with cleared bits are compared, and if the received word is different than the corresponding word in the shared storage is different, the corresponding bits are set and the word in shared storage 142 is immediately updated. In this alternative, the bit masks use less storage than the staged cache lines.

7 CIRCUIT/PHYSICAL ARRANGEMENT

Alternative physical embodiments of the systems described above can be used. For instance, each sache controller may be coupled directly to its associated instruction processor in an integrated circuit. The sache storage may also be included in the integrated circuit.

The shared memory system can be physically embodied in a variety of forms. For example, the shared memory system can be implemented as a centralized storage, or can be implemented as a distributed shared memory system with portions of its storage located with the instruction processors.

The shared memory system may be coupled to the saches over a data network. In one such alternative embodiment, the saches are coupled to a shared memory system on server computer over the Internet.

In the described embodiments, the saches are associated with instruction processors. In alternative embodiments, separate sache storage is associated with virtual instruction processors, for example, a separate sache storage being associated with each program executing on the instruction processor.

What is claimed is:

1. A computer system comprising:
   a hierarchical memory system, including a first local storage, and a main storage; and a first memory access unit coupled to the hierarchical memory system capable of processing a plurality of memory access instructions that includes (a) a first instruction that specifies a first address and a first value, wherein processing the first instruction by the first memory access unit causes the first value to be stored at a location in the first local storage that is associated with the first address such that after the processing of the first instruction the first value has not necessarily been stored in the main storage, and (b) a second instruction that specifies the first address, wherein processing of the second instruction by the first memory access unit after processing the first instruction and prior to the first value having been stored in the main storage is such that the first memory access unit complete processing of the second instruction only after the first value has been stored at a location in the main storage that is associated with the first address.

2. The computer system of claim 1 wherein the plurality of memory access instructions further includes (c) a third instruction that specifies the first address, wherein processing of the third instruction by the first memory access unit causes a value to be retrieved from a location in the first local storage that is associated with the first address, and (d) a fourth instruction that specifies the first address, wherein processing of the fourth instruction by the first memory access unit prior to processing the third instruction causes the value retrieved during processing the third instruction to be a value that was retrieved from a location in the main storage that is associated with the first address at a time after the fourth instruction was begun to be processed.

3. The computer system of claim 1 wherein the hierarchical memory system further includes a second local storage, and the computer system further comprises a second memory access unit coupled to the hierarchical memory system capable of processing the plurality of memory access, and the plurality of instructions further includes:

(c) a third instruction that specifies the first address, wherein processing of the third instruction by the second memory access unit causes a value to be retrieved from a location in the second local storage that is associated with the first address, and (d) a fourth instruction that specifies the first address, wherein processing of the fourth instruction by the second memory access unit prior to processing the third instruction and after the first memory access unit has completed processing the second instruction causes the value retrieved during processing the third instruction to be a value that was retrieved from a location in the main storage that is associated with the first address at a time after the fourth instruction was begun to be processed, whereby the value caused to be retrieved by the processing of the third instruction by the second memory access unit is the first value, which was specified in the first instruction which was processed by the first memory access unit.

4. A computer processor for use in a multiple processor system in which the computer processor is coupled to one or more other processors through a memory system, the computer processor comprises a memory access unit configured to access the memory system by processing a plurality of memory access instructions, including (a) a first instruction that specifies a first address and a first value, wherein processing the first instruction causes the first value to be stored at a location in the memory system that is associated with the first address, such that at least one of the one or more other processors does not necessarily have access to the first value using a memory access instruction executed after completion of processing of the first instruction, and (b) a second instruction that specifies the first address, wherein processing of the second instruction after processing the first instruction is such that after completion of the processing of the second instruction the first value has been accessible to each of the one or more other processors.

5. The computer processor of claim 4 wherein the plurality of memory access instructions further includes (c) a third instruction that specifies a second address, wherein processing of the third instruction causes a value to be retrieved from a location in the memory system that is associated with the second address, and (d) a fourth instruction that specifies the second address, wherein processing of the fourth instruction prior to processing the third instruction causes the third instruction to retrieve a value that was previously stored in the memory system by one of the one or more other processors.

6. A multiple processor computer configured to use a storage system, the computer comprising a plurality of memory access units, including:

a first memory access unit responsive to execution of instructions by a first instruction processor, wherein the first memory access unit is coupled to the storage system; and a second memory access unit responsive to execution of instructions by a second instruction processor, wherein the second memory access unit is coupled to the storage system;

wherein the first and the second memory access units are each capable of issuing memory access messages to the storage system and receiving return messages from the storage system in response to the memory access messages, the memory access messages and return messages including:

a first memory access message that specifies a first address and a first value for causing the first value to be stored at a first location in storage system that is associated with the first address;

a first return message that is a response to the first memory access message, indicating that the first value has been stored in the storage system at a location that is associated with the first address and that is accessible to the one of the memory access units that received the first return message;

a second return message indicating that the first value has been stored in the storage system at a location that is associated with the first address and that is accessible to each of the plurality of memory access units.

7. The multiple processor computer of claim 6 wherein the memory access messages and return messages further include a second memory access message that specifies the first address, and wherein the second return message is a response to the second memory access message.

8. The multiple processor computer of claim 7 wherein the first memory access unit is configured to issue the first memory access message in response to execution of a first processor instruction that specifies the first address and the first value, and is configured to issue the second memory access message in response to execution of a second processor instruction that specifies the first address.

9. A memory system for use in a multiple processor computer system in which the memory system is coupled to a plurality of computer processors, wherein the memory system comprises a plurality of local storages, including a first local storage unit and other local storage units, and each local storage unit is capable of processing a plurality messages received from a corresponding one of the computer processors, the plurality of messages includes:
  (a) a first message that specifies a first address and a first value, wherein processing the first message by the first local storage unit causes the first value to be stored at a location in the local storage unit that is associated with the first address, such that, for at least a period of time, the other local storage units do not have access to the first value, and
  (b) a second message that specifies the first address, wherein processing of the second message by the first local storage unit after processing the first message is such that the processing of the second message completes after the first value can be accessed by each of the other local storage units.

10. The memory system of claim 9 wherein the plurality of memory access messages further includes
  (c) a third message that specifies a second address, wherein processing of the third message causes a value to be retrieved from a location in the first local storage that is associated with the second address and to be sent to the corresponding computer processor, and
  (d) a fourth message that specifies the second address, wherein processing of the fourth message prior to processing the third message guarantees that the value caused to be sent in processing the third message is a value that was previously stored in the memory system by one of the other processors.

11. The memory system of claim 9 further comprising:
  a main storage wherein values stored in the main storage are accessible to each of the plurality of local storages; and
  a controller configured to transfer data between the main storage and the plurality of local storages according to a plurality of stored rules.

12. The memory system of claim 11 wherein the plurality of stored rules includes:
  a rule for initiating a transfer of the first value from the local storages to the main storage after processing the first message and prior to processing the second message.

13. A computer processor for use in a multiple processor computer system in which the computer processor and one or more other computer processors are coupled to a storage system, the computer processor comprising:
  a storage capable of holding a sequence of instructions, wherein the sequence of instructions includes a first instruction that specifies a first address range and a second address range, and includes a first set of instructions that each specifies an address in the first address range and that are prior to the first instruction in the sequence, and a second set of instructions that each specifies an address in the second address range and that are after the first instruction in the sequence;
  an instruction scheduler coupled to said storage, wherein the instruction scheduler is configured to issue instructions in the sequence of instructions such that instructions in the second set of instructions do not issue prior to all of the instructions in the first set of instructions completing.

14. The computer processor of claim 13 wherein the first set of instructions includes instructions that may result in data previously stored in the storage system by one of the one or more other processors at an address in the first address range being transferred to the computer processor.

15. The computer processor of claim 14 wherein the second set of instructions includes instructions that each initiates a transfer of data from the computer processor to for storage at an address in the second address range such that the data is accessible to the one or more other processors.

16. The computer processor of claim 14 wherein the second set of instructions includes instructions that may result in data previously stored in the storage system by one of the one or more other processors at an address in the second address range being transferred to the computer processor.

17. The computer processor of claim 13 wherein the first set of instructions includes instructions that each completes after the instruction scheduler receives a corresponding notification from the storage system that a value has been stored in the storage system at an address in the first address range such that the value is accessible to the one or more other processors.

18. The computer processor of claim 17 wherein the second set of instructions includes instructions that initiate a transfer of data from the computer processor to for storage at an address in the second address range such that the data is accessible to the one or more other processors.

19. The computer processor of claim 17 wherein the second set of instructions includes instructions that may result in data previously stored in the storage system by one of the one or more other processors at an address in the second address range being transferred to the computer processor.

20. A method for accessing a memory system from a processor in a multiple processor computer system in which the computer processor is coupled to one or more other processors through a memory system, comprising:
  (a) in a first processor that is coupled to a first local storage in the memory system, processing a first instruction that specifies a first address and a first value, including storing the first value at a location in the first local storage that is associated with the first address such that at least one of the one or more other processors does not necessarily have access to the first value through the memory system after completion of the processing of the first instruction, and
  (b) in the first processor, after processing the first instruction, processing a second instruction that specifies the first address, wherein processing of the second instruction completes only after the first value has been accessible to each of the one or more other processors.

21. The method of claim 20 further comprising:
  (c) in a second processor that is coupled to a second local storage in the memory system, processing a third instruction that specifies the first address, including retrieving a value from a location in the second local storage that is associated with the first address, and
  (d) in the second processor, processing a fourth instruction that specifies the first address prior to processing the third instruction and after the first processor has completed processing the second instruction, including retrieving the first value from the location in the shared storage that is associated with the first address and storing the first value at a location in the second local storage that is associated with the first address, whereby the value retrieved in the processing of the third instruction is the first value, which was specified in the first instruction.

22. A method for providing data storage for a plurality of computer processors in a memory system that includes a plurality of local storages, including a first local storage unit and other local storage units, the method comprising:
   receiving at the first local storage a first message from a corresponding one of the plurality of computer processors, wherein the first message specifies a first address and a first value;
   processing the first message by the first local storage unit including storing the first value at a location in the local storage unit that is associated with the first address, such that, for at least a period of time, the other local storage units do not have access to the first value;
   receiving at the first local storage a second message from the corresponding one of the plurality of computer processors, wherein the second message specifies the first address;
   processing the second message by the first local storage unit after processing the first message such that the processing of the second message completes after the first value can be accessed by each of the other local storage units.

23. The method of claim 22 further comprising:
   receiving by the first local storage unit a third message from the corresponding one of the plurality of computer processors, wherein the third message specifies a second address;
   processing the third message including retrieving a value from a location in the first local storage that is associated with the second address and sending the retrieved value to the corresponding one of the plurality of computer processors;
   receiving by the first local storage unit a fourth message from the corresponding one of the plurality of computer processors, wherein the fourth message specifies the second address; and
   processing of the fourth message prior to processing the third message;
   wherein the value sent in processing the third message is a value that was previously stored in the memory system by one of the other processors.

24. The method of claim 22 wherein the memory system includes a main storage wherein values stored in the main storage are accessible to each of the plurality of local storages, and the method further comprises:
   accessing a plurality of stored rules; and
   transferring data between the main storage and the plurality of local storages according to the accessed rules.

25. The method of claim 24 wherein transferring data between the main storage and the plurality of local storages includes initiating a transfer of the first value from the local storages to the main storage after processing the first message and prior to processing the second message.

26. A computer system comprising:
   a hierarchical memory system, including a first local storage, and a main storage; and
   a first memory access unit coupled to the hierarchical memory system capable of processing a plurality of memory access instructions that includes
   (a) a first instruction that specifies a first address and a first value, wherein processing the first instruction by the first memory access unit causes the first value to be stored at a location in the first local storage that is associated with the first address,
   (b) a second instruction that specifies the first address, wherein processing of the second instruction by the first memory access unit after processing the first instruction is such that the first memory access unit complete processing of the second instruction after the first value is stored at a location in the main storage that is associated with the first address,
   (c) a third instruction that specifies the first address, wherein processing of the third instruction by the first memory access unit causes a value to be retrieved from a location in the first local storage that is associated with the first address, and
   (d) a fourth instruction that specifies the first address, wherein processing of the fourth instruction by the first memory access unit prior to processing the third instruction causes the value retrieved during processing the third instruction to be a value that was retrieved from a location in the main storage that is associated with the first address at a time after the fourth instruction was begun to be processed.

27. A computer system comprising:
   a hierarchical memory system, including a first local storage, a second local storage, and a main storage; and
   a first memory access unit coupled to the hierarchical memory system capable of processing a plurality of memory access instructions that includes
   (a) a first instruction that specifies a first address and a first value, wherein processing the first instruction by the first memory access unit causes the first value to be stored at a location in the first local storage that is associated with the first address, and
   (b) a second instruction that specifies the first address, wherein processing of the second instruction by the first memory access unit after processing the first instruction is such that the first memory access unit complete processing of the second instruction after the first value is stored at a location in the main storage that is associated with the first address; and
   a second memory access unit coupled to the hierarchical memory system capable of processing the plurality of memory access, and the plurality of instructions further includes
   (c) a third instruction that specifies the first address, wherein processing of the third instruction by the second memory access unit causes a value to be retrieved from a location in the second local storage that is associated with the first address, and
   (d) a fourth instruction that specifies the first address, wherein processing of the fourth instruction by the second memory access unit prior to processing the third instruction and after the first memory access unit has completed processing the second instruction causes the value retrieved during processing the third instruction to be a value that was retrieved from a location in the main storage that is associated with the first address at a time after the fourth instruction was begun to be processed, whereby the value caused to be retrieved by the processing of the third instruction by the second memory access unit is the first value, which was specified in the first instruction which was processed by the first memory access unit.

28. A computer processor for use in a multiple processor system in which the computer processor is coupled to one or more other processors through a memory system, the computer processor comprises a memory access unit configured to access the memory system by processing a plurality of memory access instructions, including (a) a first instruction that specifies a first address and a first value, wherein processing the first instruction causes the first value to be stored at a location in the memory system that is associated with the first address, such that for at least some period of time the one or more other processors do not have access to the first value;

(b) a second instruction that specifies the first address, wherein processing of the second instruction after processing the first instruction is such that the processing of the second instruction completes after the first value is accessible to each of the one or more other processors;

(c) a third instruction that specifies a second address, wherein processing of the third instruction causes a value to be retrieved from a location in the memory system that is associated with the second address; and (d) a fourth instruction that specifies the second address, wherein processing of the fourth instruction prior to processing the third instruction causes the third instruction to retrieve a value that was previously stored in the memory system by one of the one or more other processors.

29. A method for accessing a memory system from a processor in a multiple processor computer system, comprising:

(a) in a first processor that is coupled to a first local storage in the memory system, processing a first instruction that specifies a first address and a first value, including storing the first value at a location in the first local storage that is associated with the first address, (b) in the first processor, after processing the first instruction, processing a second instruction that specifies the first address, wherein processing of the second instruction completes after the first value is stored at a location in a shared storage in the memory system that is associated with the first address, (c) in a second processor that is coupled to a second local storage in the memory system, processing a third instruction that specifies the first address, including retrieving a value from a location in the second local storage that is associated with the first address, and (d) in the second processor, processing a fourth instruction that specifies the first address prior to processing the third instruction and after the first processor has completed processing the second instruction, including retrieving the first value from the location in the shared storage that is associated with the first address and storing the first value at a location in the second local storage that is associated with the first address, whereby the value retrieved in the processing of the third instruction is the first value, which was specified in the first instruction.

* * * * *